US010173695B2

(12) United States Patent
Stenneth et al.

(10) Patent No.: US 10,173,695 B2
(45) Date of Patent: Jan. 8, 2019

(54) METHOD AND APPARATUS FOR PROVIDING NOTIFICATIONS BASED ON RANKING OF ROAD LINKS

(71) Applicant: HERE Global B.V., Veldhoven (NL)

(72) Inventors: Leon Stenneth, Chicago, IL (US); Alex Averbuch, Buffalo Grove, IL (US); Gavril Adrian Giurgiu, Chicago, IL (US); Dongwook Jang, Lisle, IL (US)

(73) Assignee: HERE Global B.V., Veldhoven (NL)

( * ) Notice: Subject to any disclaimer, the term of this patent is extended or adjusted under 35 U.S.C. 154(b) by 137 days.

(21) Appl. No.: 14/552,074

(22) Filed: Nov. 24, 2014

(65) Prior Publication Data
US 2016/0144853 A1 May 26, 2016

(51) Int. Cl.
*G06F 7/00* (2006.01)
*B60W 50/14* (2012.01)
(Continued)

(52) U.S. Cl.
CPC ...... *B60W 50/14* (2013.01); *B60W 30/18145* (2013.01); *G08G 1/0112* (2013.01);
(Continued)

(58) Field of Classification Search
CPC .................................................. B50W 30/00
(Continued)

(56) References Cited

U.S. PATENT DOCUMENTS

| 6,415,226 B1 | 7/2002 | Kozak |
| 2004/0236474 A1 | 11/2004 | Chowdhary et al. |

(Continued)

FOREIGN PATENT DOCUMENTS

| CN | 103459225 A | 12/2013 |
| WO | 2008/041899 A1 | 4/2008 |

OTHER PUBLICATIONS

R. Andrášik et al., "Identification of Curves and Straight Sections on Road Networks from Digital Vector Data", Transactions on Transport Sciences, vol. 6, No. 2, Jun. 2013, pp. 73-80.

*Primary Examiner* — Adam D Tissot
(74) *Attorney, Agent, or Firm* — Ditthavong & Steiner, P.C.

(57) ABSTRACT

An approach is provided for prioritizing notification to one or more vehicles based on the ranking of one or more road links. The approach involves determining one or more road links that are associated with at least one curvature value greater than at least one curvature threshold value. The approach also involves determining humanized speed information and speed limit information for the one or more road links. The approach further involves processing and/or facilitating a processing of the at least one curvature value, the humanized speed information, and the speed limit information to determine danger level information for the one or more road links. The approach also involves causing, at least in part, a ranking of the one or more road links based, at least in part, on the danger level information. The approach further involves causing, at least in part, a prioritization of one or more notifications to one or more vehicles approaching or traveling the one or more road links based, at least in part, on the ranking of the one or more road links.

16 Claims, 21 Drawing Sheets

(51) Int. Cl.
*B60W 30/18* (2012.01)
*G08G 1/01* (2006.01)
*G08G 1/052* (2006.01)
*G08G 1/0967* (2006.01)

(52) U.S. Cl.
CPC ......... *G08G 1/0129* (2013.01); *G08G 1/0141* (2013.01); *G08G 1/052* (2013.01); *G08G 1/096716* (2013.01); *G08G 1/096725* (2013.01); *G08G 1/096758* (2013.01); *G08G 1/096775* (2013.01); *B60W 2050/146* (2013.01); *B60W 2550/146* (2013.01); *B60W 2550/402* (2013.01)

(58) Field of Classification Search
USPC ............................................................ 701/1
See application file for complete search history.

(56) References Cited

U.S. PATENT DOCUMENTS

| | | | |
|---|---|---|---|
| 2009/0299624 A1 | 12/2009 | Denaro | |
| 2011/0153742 A1* | 6/2011 | Sloop | G01C 21/3691 709/204 |
| 2012/0259547 A1* | 10/2012 | Morlock | G01C 21/32 701/533 |
| 2012/0280835 A1* | 11/2012 | Raz | G08G 1/0112 340/905 |
| 2014/0188383 A1 | 7/2014 | Denaro | |
| 2014/0244125 A1* | 8/2014 | Dorum | G01C 21/32 701/70 |

* cited by examiner

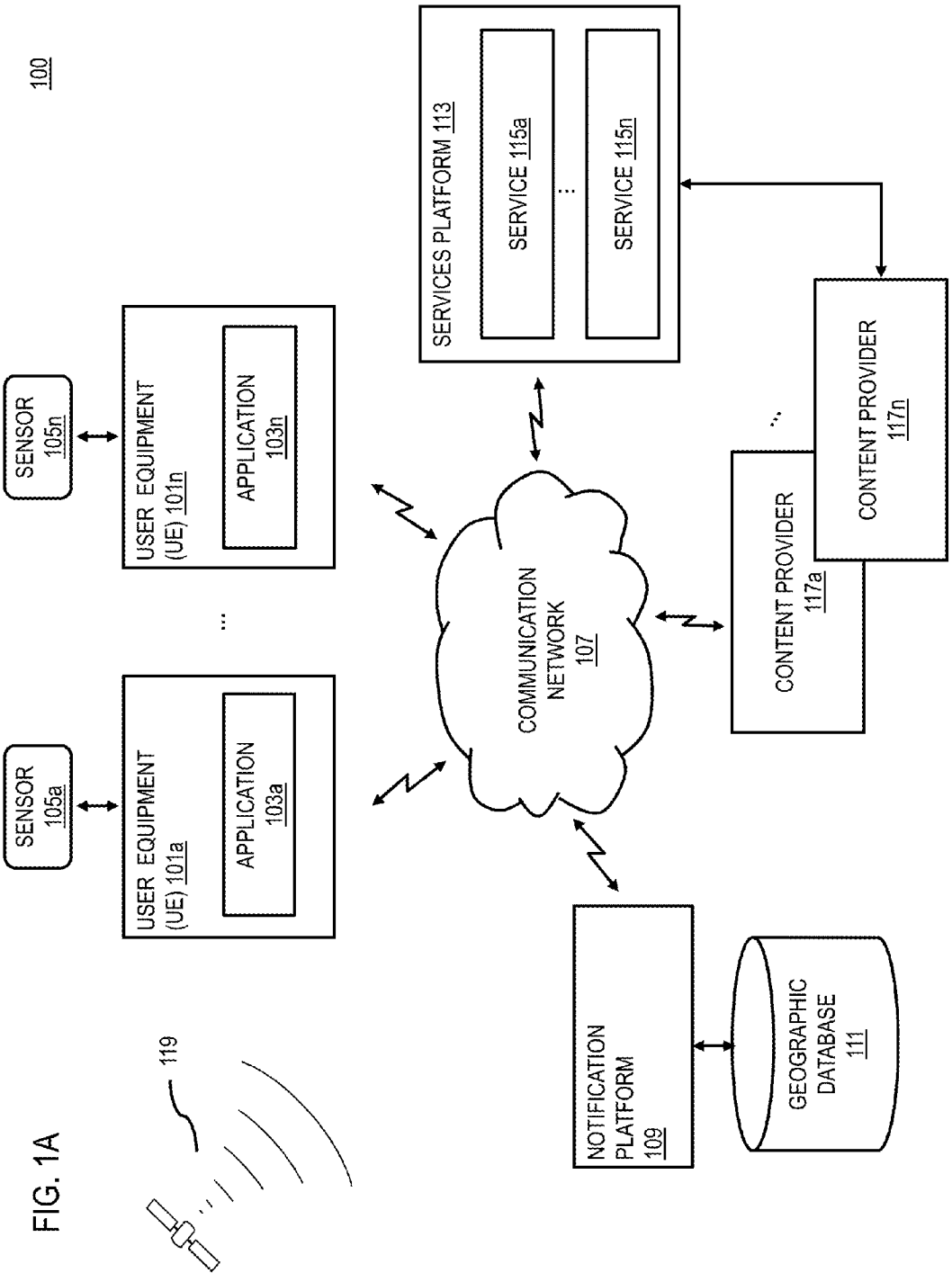

START → 601 DETERMINE A GRANULARITY OF THE SEGMENTATION BASED, AT LEAST IN PART, ON A LENGTH OF THE ONE OR MORE SEGMENTS → 603 CAUSE AN ALIGNMENT OF A SEGMENTATION FOR DETERMINING THE AT LEAST ONE CURVATURE VALUE AND/OR THE HUMANIZED SPEED INFORMATION AND/OR THE SPEED LIMIT INFORMATION BASED, AT LEAST IN PART, ON THE GRANULARITY → 605 PROCESS AND/OR FACILITATE A PROCESSING OF HISTORICAL PROBE DATA ASSOCIATED WITH THE ONE OR MORE ROAD LINKS TO DETERMINE THE HUMANIZED SPEED INFORMATION → END

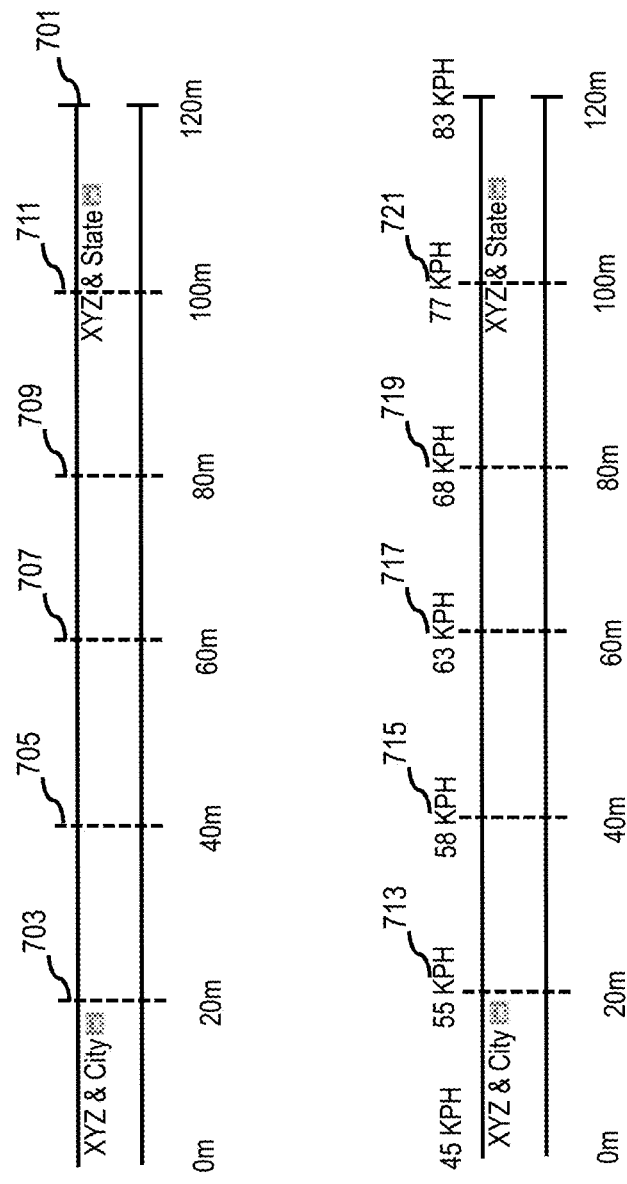

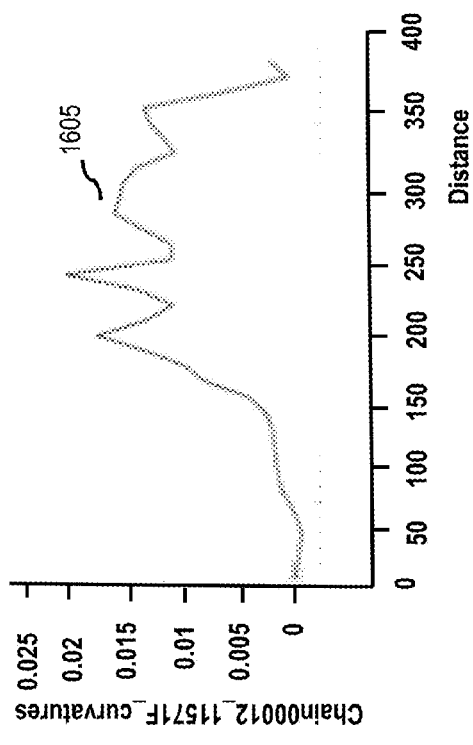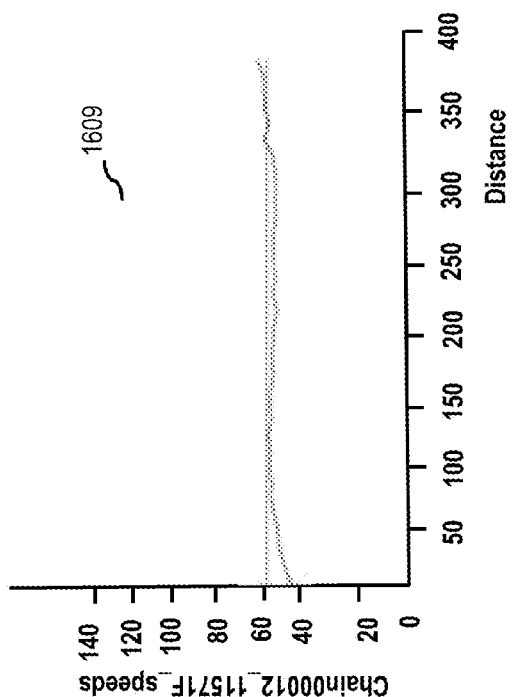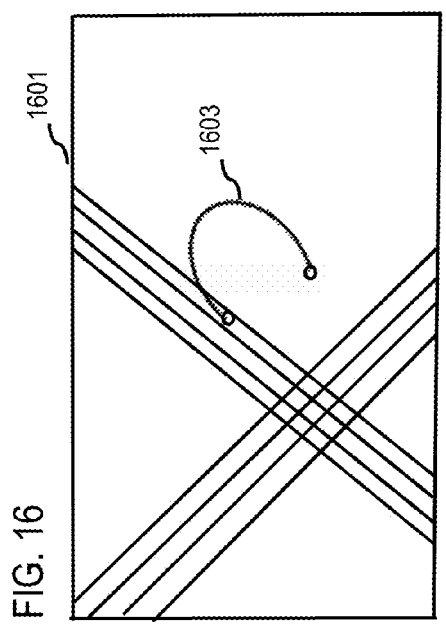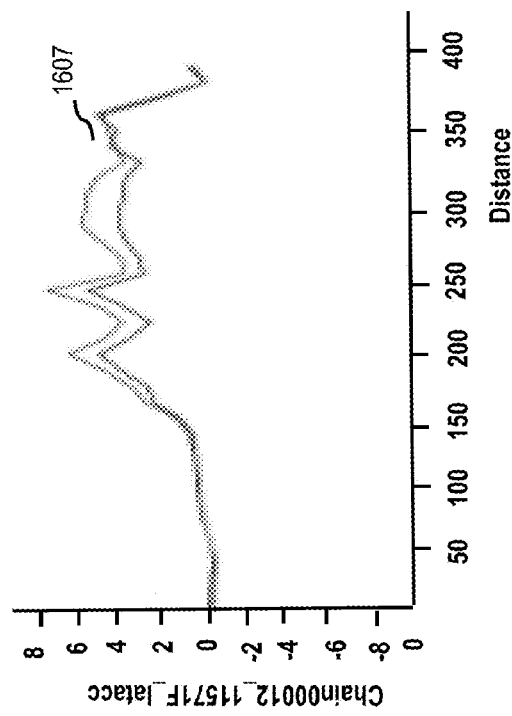
FIG. 16

METHOD AND APPARATUS FOR PROVIDING NOTIFICATIONS BASED ON RANKING OF ROAD LINKS

BACKGROUND

Advancement in vehicle safety has progressed over time, however, vehicle accidents are still an issue. Accident risks are higher when a curve in a travel route is unexpected, for example, a hidden sharp curvature. Since critical driving maneuvers occur more on curves, a well-timed notification is desired for drivers to be able to follow the instructions. Accordingly service providers and device manufacturers (e.g., wireless, cellular, etc.) are continually challenged to deliver value and convenience to consumers by, for example, providing a service that monitors, assesses, and ranks road features, and timely alerts the drivers of any potential danger in the travel route.

Some Example Embodiments

Therefore, there is a need for an approach for prioritizing notification to one or more vehicles based on the ranking of one or more road links.

According to one embodiment, a method comprises determining one or more road links that are associated with at least one curvature value greater than at least one curvature threshold value. The method also comprises determining humanized speed information and speed limit information for the one or more road links. A humanized speed represents the average human speed and can be computed as the average probe speed. The method further comprises processing and/or facilitating a processing of the at least one curvature value, the humanized speed information, and the speed limit information to determine danger level information for the one or more road links. The method also comprises causing, at least in part, a ranking of the one or more road links based, at least in part, on the danger level information. The method also comprises causing, at least in part, a prioritization of one or more notifications to one or more vehicles approaching or traveling the one or more road links based, at least in part, on the ranking of the one or more road links.

According to another embodiment, an apparatus comprises at least one processor, and at least one memory including computer program code for one or more computer programs, the at least one memory and the computer program code configured to, with the at least one processor, cause, at least in part, the apparatus to determine one or more road links that are associated with at least one curvature value greater than at least one curvature threshold value. The apparatus is also caused to determine humanized speed information and speed limit information for the one or more road links. The apparatus is further caused to process and/or facilitate a processing of the at least one curvature value, the humanized speed information, and the speed limit information to determine danger level information for the one or more road links. The apparatus is also caused to cause, at least in part, a ranking of the one or more road links based, at least in part, on the danger level information. The apparatus is also caused to cause, at least in part, a prioritization of one or more notifications to one or more vehicles approaching or traveling the one or more road links based, at least in part, on the ranking of the one or more road links.

According to another embodiment, a computer-readable storage medium carries one or more sequences of one or more instructions which, when executed by one or more processors, cause, at least in part, an apparatus to determine one or more road links that are associated with at least one curvature value greater than at least one curvature threshold value. The apparatus is also caused to determine humanized speed information and speed limit information for the one or more road links. The apparatus is further caused to process and/or facilitate a processing of the at least one curvature value, the humanized speed information, and the speed limit information to determine danger level information for the one or more road links. The apparatus is also caused to cause, at least in part, a ranking of the one or more road links based, at least in part, on the danger level information. The apparatus is also caused to cause, at least in part, a prioritization of one or more notifications to one or more vehicles approaching or traveling the one or more road links based, at least in part, on the ranking of the one or more road links.

According to another embodiment, an apparatus comprises means for determining one or more road links that are associated with at least one curvature value greater than at least one curvature threshold value. The apparatus also comprises means for determining humanized speed information and speed limit information for the one or more road links. The apparatus further comprises means for processing and/or facilitating a processing of the at least one curvature value, the humanized speed information, and the speed limit information to determine danger level information for the one or more road links. The apparatus also comprises means for causing, at least in part, a ranking of the one or more road links based, at least in part, on the danger level information. The apparatus also comprises means for causing, at least in part, a prioritization of one or more notifications to one or more vehicles approaching or traveling the one or more road links based, at least in part, on the ranking of the one or more road links.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes such as the road link ranking process) can be accomplished on the service provider side or on the mobile device side or in any shared way between service provider and mobile device with actions being performed on both sides.

For various example embodiments, the following is applicable: An apparatus comprising means for performing the method of any of the originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a system capable of prioritizing notification to one or more vehicles based on the ranking of one or more road links, according to one embodiment;

FIG. 6 is a flowchart of a process for determining granularity of segmentation, according to one embodiment;

FIG. 7A is a graph diagram that represents distance based segmentation for humanized driving, according to one example embodiment;

FIG. 7B is a graph diagram that represents humanized speed at segment level, according to one example embodiment;

FIG. 16 is a graph diagrams that represents detected dangerous curves with their detailed properties, according to one example embodiment;

DESCRIPTION OF SOME EMBODIMENTS

Figure 1B:
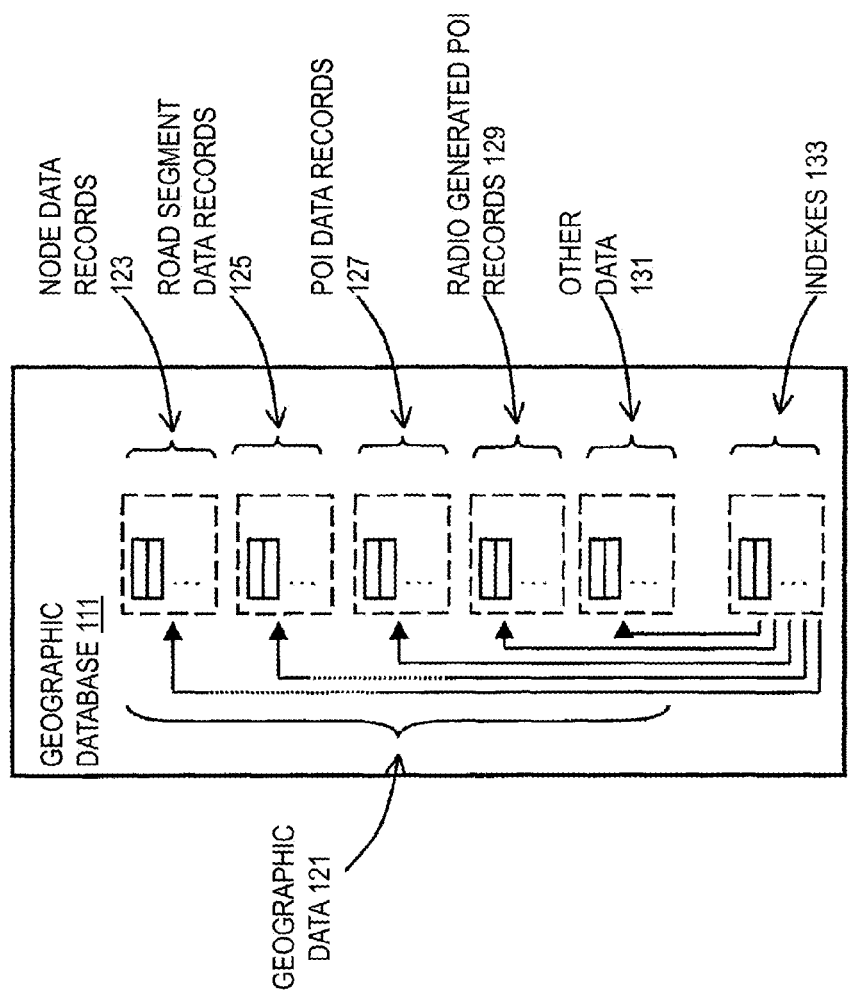
FIG. 1B is a diagram of the geographic database 111 of system 100, according to exemplary embodiments.

Examples of a method, apparatus, and computer program for prioritizing notification to one or more vehicles based on the ranking of one or more road links are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1A is a diagram of a system capable of prioritizing notification to one or more vehicles based on the ranking of one or more road links, according to one embodiment. As discussed, innumerable road accidents take place because driver were unaware of road features to maintain appropriate speed limit, for example, an unexpected sharp curve. Needless to mention, the accident risk is intense when the curve is unanticipated because it does not give a driver an opportunity to make an informed decision. Further, an unexpected sharp turn may cause inconsistency on the interaction between the driver and the vehicle, thereby increasing the risk for accidents. It is generally helpful to drivers if they are made aware of road features ahead of time, for example, notifications on upcoming dangerous curves, speed limit on dangerous curves, etc. Accordingly, prioritization is important during notification because vehicles are mobile, and it is important to alert vehicles that are closest to the most dangerous curves. Further, there are several road signs that indicate the direction of curves (i.e., whether the curves are to the right or to the left), the degree of curves (e.g., sharp-ended curves), the series of curves in a road link etc. However, every single curve in a road link is not dangerous. To address this problem, system 100 of FIG. 1A introduces a solution that identifies, selects and ranks road links based on their danger potential. The danger potential may be a measure of the probability of having a dangerous driving condition, such as, an accident. In one scenario, this problem can be stated as a top 'K' problem, wherein the system 100 finds the top 'K' most dangerous curves in a road link. Since the output of the algorithm is ranking of the most dangerous curves, system 100 may select the top 'K' from the ranking. In another scenario, the system 100 may identify dangerous curves on the at least one road link. The system 100 may consider various factors while identifying dangerous road link, for example, curvature, speed limit, human behavior, etc. Subsequently, the identified road link may be selected and ranked. The ranking of one or more road links is based on danger level, and is used to prioritize notification, for example, warning driver in advance so that they are prepared while driving on the curve identified, and/or selected, and/or ranked as dangerous.

As shown in FIG. 1A, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to a notification platform 109 via the communication network 107. In one embodiment, the notification platform 109 performs one or more functions associated with prioritizing notification to one or more vehicles based on the ranking of one or more road links.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the UE 101 may be a vehicle (e.g., cars), a mobile device (e.g., phone), and/or a combination of the two.

By way of example, the applications 103 may be any type of application that is executable at the UE 101, such as location-based service applications, navigation applications, mapping application, content provisioning services, camera/imaging application, media player applications, social networking applications, calendar applications, and the like. In one embodiment, one of the applications 103 at the UE 101 may act as a client for the notification platform 109 and perform one or more functions associated with the functions of the notification platform 109 by interacting with the notification platform 109 over the communication network 107. In one scenario, applications 103 may be an application for determining curvature value for one or more road links. In another scenario, applications 103 may interface with the sensors 105 and/or the services platform 113 via the communication network 107 for determining humanized speed information, speed limit information for the one or more road links, or a combination thereof.

By way of example, the sensors 105 may be any type of sensor. In certain embodiments, the sensors 105 may include, for example, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, and the like. In one example embodiment, the UE 101 may include GPS receivers to obtain geographic coordinates from satellites 119 for determining current location and time associated with the UE 101. In another example embodiment, the one or more sensors may provide in-vehicle navigation services, wherein one or more location based services may be provided to the at least one UE 101 associated with the at least one user of the vehicle and/or at least one other UE 101 associated with the at least one vehicle.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the notification platform 109 may be a platform with multiple interconnected components. The notification platform 109 may include multiple servers, intelligent networking devices, computing devices, components and corresponding software for prioritizing notification to one or more vehicles based on the ranking of one or more road links. In addition, it is noted that the notification platform 109 may be a separate entity of the system 100, a part of the one or more services 115a-115n (collectively referred to as services 115) of the services platform 113, or included within the UE 101 (e.g., as part of the applications 103.

In one scenario, a dangerous curve is an unsafe or an unexpected bend in a road link, for example, curves that are continuous, curves that are sharp-ended. Then again, not all curves in a road link are dangerous, for example, curvatures at roundabouts. As a result, the notification platform 109 identifies dangerous curves in at least one road link. Then, the notification platform 109 may rank the road link based on danger level. Subsequently, the notification platform 109 prioritizes notification based on the ranking. In one example embodiment, the notification platform 109 may give priority to road links ranked higher over road links ranked lower during traffic notification. In one scenario, the traffic notification may include speed recommendations that incorporate angle of the curve, the environment around the vehicle (e.g., weather, road surface etc.), or a combination thereof. In another example embodiment, the notification platform 109 may give priority to at least one autonomous vehicle closest to the highest ranking curve while sending dangerous curve warnings. The autonomous vehicle upon receiving the notification may reduce the engine torque and may apply brakes to slow the vehicle speed.

In one scenario, the notification platform 109 selects or identifies only the most dangerous curves in a geographic area. Then, the notification platform 109 prioritizes dissemination of information according to the danger ranking of a road link. In one example embodiment, while reporting traffic updates, curves with the highest danger level are reported first. In another example embodiment, while sending dangerous curve warnings to self-driving vehicles, the vehicle closest to the highest ranking curve is notified first. In such manner, the notification platform 109 prioritizes vehicular notifications according to the danger level of a road link the drivers are about to enter. Thus, vehicles that are approaching the most dangerous curves are sent notifications first. In another scenario, the notification platform 109 may prioritize traffic broadcast according to danger level of the road links, wherein notification is first provided to the road links that have the highest danger. In addition, prioritization is important since the channels in any traffic system have limited bandwidth, as a result the notification platform 109 may update the most dangerous road links first.

In one embodiment, the notification platform 109 may combine several situations and road attributes to identify dangerous curves. The notification platform 109 may initiate an analysis by making chains of links on a map where starting and ending of chains are constraint by intersections. Once chains are identified, the chains may be segmented in intervals, and for each interval, humanized driving speed is calculated. Any interval length can be considered e.g. 10 m. In one embodiment, the notification platform 109 may perform the following functions to identify dangerous curves:

1. Count the number of consecutive road links (nc) which have curvature higher than threshold (cmin). In one scenario, the cmin is 0.01 which corresponds to 100 meter radius. The (nc) should be greater than or equal to 3 to be considered as dangerous. The rationale behind this approach is that the more consecutive high curvature in a road link, the more dangerous the road link. Since, curvatures are derived from three adjacent shape points, the starting and ending point of chains do not have curvature.

$nc \geq 3$ where $cmin = 0.01$

2. Within the identified road links from the procedure 1, maximum lateral acceleration (alat) should be greater than 0.3 g where g is gravitational acceleration. The lateral acceleration is obtained from curvature times humanized speed squared. Lateral acceleration is considered because it correlates curvature with speed, for example, there is a spot with very high curvature, but most people drive there less than 10 kph, then it is not dangerous. Hence, lateral acceleration is a good measure to trigger dangerous driving situation. On the other hand, humanized speed is the average speed from historical probe data, but average speed might not reflect the normal human behavior. The alternative speed could be median, or mode. The process may even use the speed limit on that road segment.

$alat = c \times v2$

3. As briefly mentioned in the procedure 2, even if the road segments have high curvature, it may not be dangerous if people drive slowly. Hence, the speed limit on the identified road segments should be higher than a certain threshold (smin).

$smin > 50$ kph

4. Finally, the speed limit (sm) on the identified road segment should be higher than the average human speed (sh). This indicates most of people already know that a certain spot is dangerous so that they slow down even if the speed limit is high.

$sm > sh$

In one embodiment, the geographic database 111 may store danger level information for one or more curves, ranking information for one or more curves, speed information for one or more users, speed limit for one or more road links, or a combination thereof. The information may be any multiple types of information that can provide means for aiding in the content provisioning and sharing process.

The services platform 113 may include any type of service. By way of example, the services platform 113 may include mapping services, navigation services, travel planning services, notification services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the notification platform 109 and the content provider 117 to supplement or aid in the processing of the content information.

By way of example, the services 115 may be an online service that reflects interests and/or activities of users. In one scenario, the services 115 may provide information on humanized speed for at least one user and a variety of additional information. The services 115 allow users to share location information, activities information, contextual information, historical user information and interests within their individual networks, and provides for data portability. The services 115 may additionally assist in providing the notification platform 109 with information on travel plans of at least one user, speed information for at least one user, user profile information, etc.

The content providers 117a-117n (collectively referred to as content provider 117) may provide content to the UE 101, the notification platform 109, and the services 115 of the services platform 113. The content provided may be any type of content, such as textual content, audio content, video content, image content, etc. In one embodiment, the content provider 117 may provide content that may supplement content of the applications 103, the sensors 105, or a combination thereof. By way of example, the content provider 117 may provide content that may aid in the processing of danger levels for one or more curves, speed information for at least one user and/or vehicle, speed limit for at least one road link, or a combination thereof. In one embodiment, the content provider 117 may also store content associated with the UE 101, the notification platform 109, and the services 115 of the services platform 113. In another embodiment, the content provider 117 may manage access to a central repository of data, and offer a consistent, standard interface to data, such as a repository of danger levels for one or more curves, speed limit one or more road links, speed information for at least one user and/or vehicle, navigational data content etc. Any known or still developing methods, techniques or processes for retrieving and/or accessing features for road links from one or more sources may be employed by the notification platform 109.

By way of example, the UE 101, the notification platform 109, the services platform 113, and the content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 1B is a diagram of the geographic database 111 of system 100, according to exemplary embodiments. In the exemplary embodiments, POIs and map generated POIs data can be stored, associated with, and/or linked to the geographic database 111 or data thereof. In one embodiment, the geographic or map database 111 includes geographic data 121 used for (or configured to be compiled to be used for) mapping and/or navigation-related services, such as for personalized route determination, according to exemplary embodiments. For example, the geographic database 111 includes node data records 123, road segment or link data records 125, POI data records 127, radio generated POI records 129, and other data records 131, for example. More, fewer or different data records can be provided. In one embodiment, the other data records 131 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 125 are links or segments representing roads, streets, or paths, as can be used in the calculated route or recorded route information for determination of one or more personalized routes, according to exemplary embodiments. The node data records 123 are end points corresponding to the respective links or segments of the road segment data records 125. The road link data records 125 and the node data records 123 represent a road network, such as used by vehicles, cars, and/or other entities. Alternatively, the geographic database 111 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 127. The geographic database 111 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city). In addition, the geographic database 111 can include data from radio advertisements associated with the POI data records 127 and their respective locations in the radio generated POI records 129. By way of example, a street is determined from the user interaction with the UE 101 and the content information associated with the UE 101, according to the various embodiments described herein.

The geographic database 111 can be maintained by the content provider in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UEs 101) to provided navigation-related functions. For example, the geographic database 111 can be used with the end user device 101 to provide an end user with navigation features. In such a case, the geographic database 111 can be downloaded or stored on the end user device UE 101, such as in applications 103, or the end user device UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions such as guidance and map display, for example, and for ranking of one or more road links.

Figure 2:
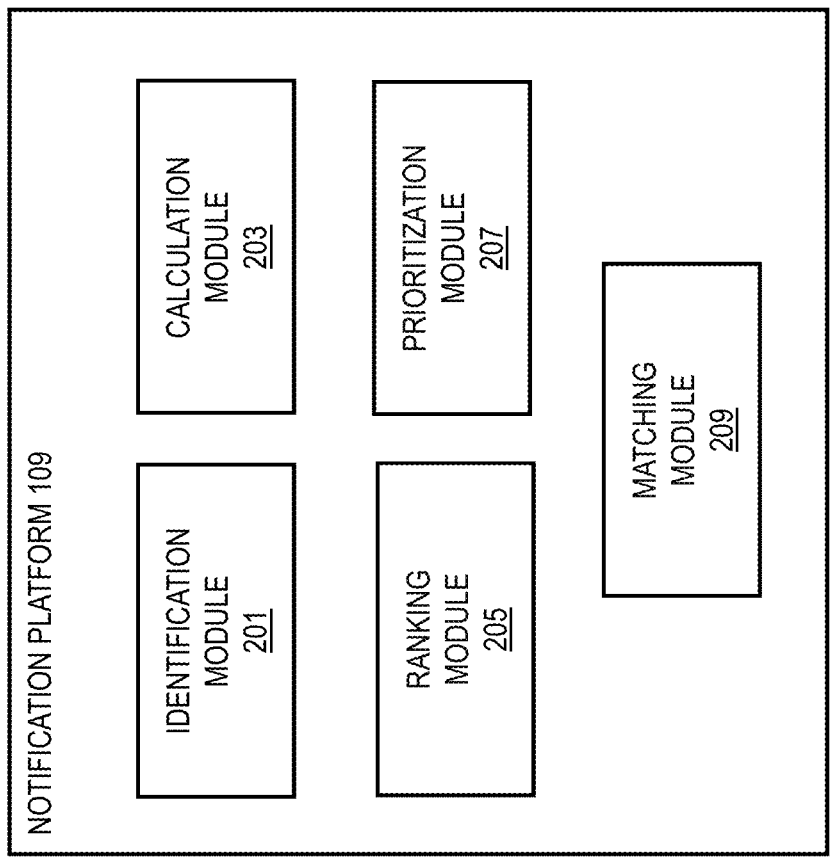
FIG. 2 is a diagram of the components of the notification platform 109, according to one embodiment.

FIG. 2 is a diagram of the components of the notification platform 109, according to one embodiment. By way of example, the notification platform 109 includes one or more components for prioritizing notification to one or more vehicles based on the ranking of one or more road links. In this embodiment, the notification platform 109 includes an identification module 201, a calculation module 203, a ranking module 205, a prioritization module 207, and a matching module 209. It is contemplated that the functions of these components may be combined in one or more components or performed by other components of equivalent functionality.

In one embodiment, the identification module 201 may identify one or more road features as dangerous. In one scenario, the identification module 201 may identify dangerous road features based, at least in part, on a determination of consecutive road links with curvature higher than a certain threshold level. The threshold level may include maximum lateral acceleration for at least one road feature, maximum speed limit for at least one road feature, or a combination thereof. In one scenario, the lateral acceleration for at least one road feature include curvature of at least one road feature, humanized driving speed, or a combination thereof. In another embodiment, the identification module 201 may identify vehicle positions, vehicle speed, travelling directions, travelling route, or a combination thereof.

In one embodiment, the calculation module 203 may calculate danger level for one or more identified road features based, at least in part, on humanized driving speed, curvature of at least one road feature, speed limit at at least one road feature, or a combination thereof. The danger level is higher for at least one road link with curvature, speed limit, or a combination thereof higher than the humanized driving speed. In another embodiment, the calculation module 203 may compute segmentation based humanized speed for at least one road link, wherein at least one road link is divided into equal segments. Then, the calculation module 203 may derive humanized speed for each segment. In one scenario, humanized driving speed include average probe speed for at least one road link, historic probe speed for at least one road link, or a combination thereof. In another scenario, the curvature of at least one road feature include an angle of at least one curve, arc length of at least one curve, degrees to which a curve bends, or a combination thereof. In a further embodiment, the calculation module 203 may determine danger level for one or more road links based, at least in part, on the speed limit. In one scenario, the speed limit for at least one identified road link may be higher than a maximum speed threshold, higher than average humanized driving speed, or a combination thereof.

In one embodiment, the ranking module 205 may cause a ranking of one or more road feature based, at least in part, on the danger level. In one scenario, the road features with higher danger level (e.g., a sharp curve with higher probability of dangerous driving condition, such as, an accident) may be highly ranked. The ranking module 205 may coordinate with the prioritization module 207 to prioritize notification based on the ranking of one or more curves.

In one embodiment, the prioritization module 207 may cause prioritization of dissemination of information based, at least in part, on the ranking. In one example embodiment, the prioritization module 207 may cause vehicular notifications, traffic broadcast, or a combination thereof based, at least in part, on the danger level of at least one road link, proximity of one or more vehicles to at least one dangerous curve, or a combination thereof.

In one embodiment, the matching module 209 may match plurality of probe speed with the at least one road link. Then, the matching module may extract an average probe speed from the plurality of probes based, at least in part, on the matching. In another embodiment, the matching module 209 may cause an alignment of granularity of curvature of at least one road link, the humanized driving speed, or a combination thereof.

The above presented modules and components of the notification platform 109 can be implemented in hardware, firmware, software, or a combination thereof. Though depicted as a separate entity in FIG. 1A, it is contemplated that the notification platform 109 may be implemented for direct operation by respective UE 101. As such, the notification platform 109 may generate direct signal inputs by way of the operating system of the UE 101 for interacting with the applications 103. In another embodiment, one or more of the modules 201-209 may be implemented for operation by respective UEs, the notification platform 109, or combination thereof. Still further, the notification platform 109 may be integrated for direct operation with services 115, such as in the form of a widget or applet, in accordance with an information and/or subscriber sharing arrangement. The various executions presented herein contemplate any and all arrangements and models.

Figure 3:
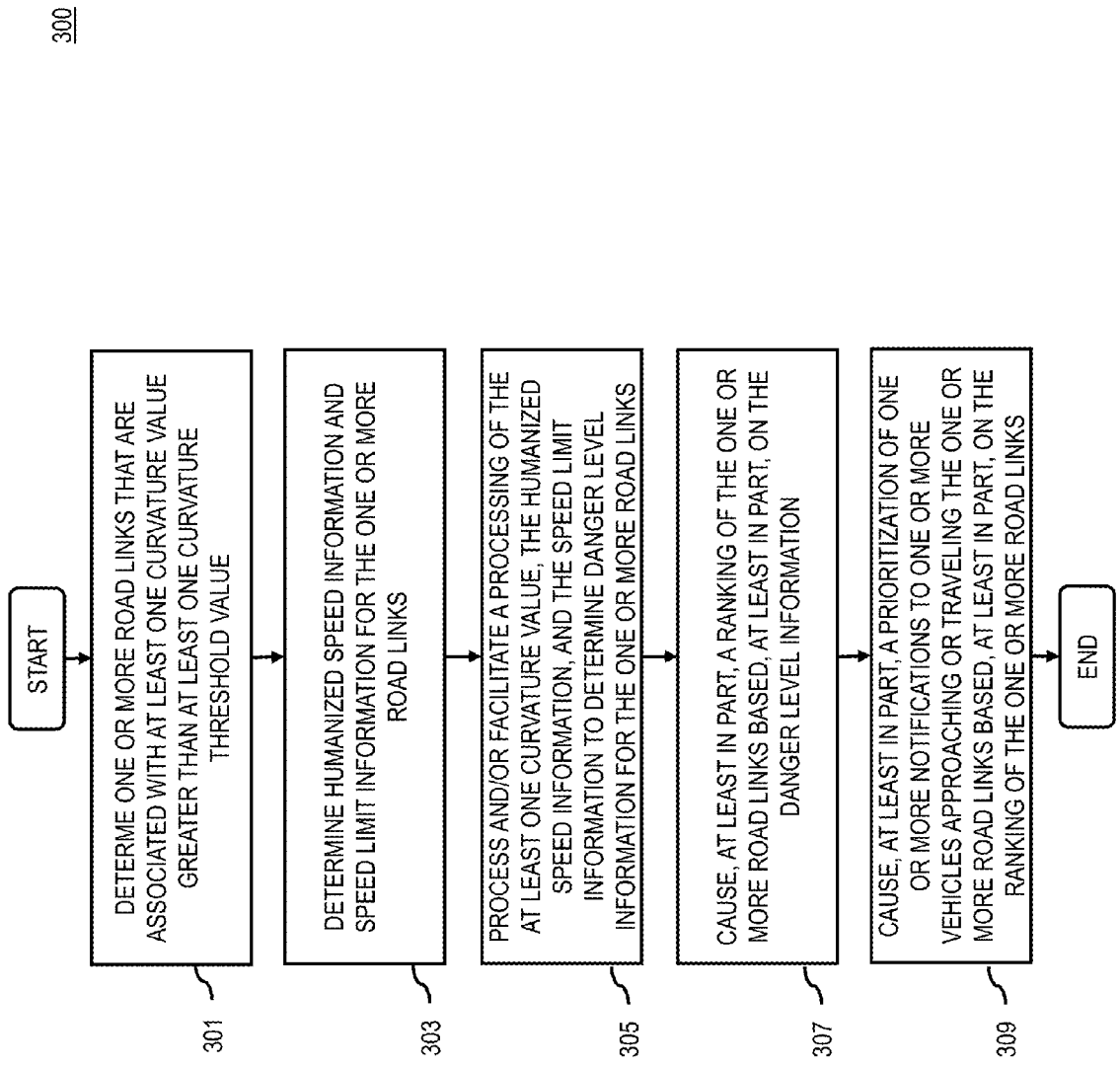
FIG. 3 is a flowchart of a process for ranking road links based on danger level information and prioritizing notifications based on the ranking, according to one embodiment.
Figure 19:
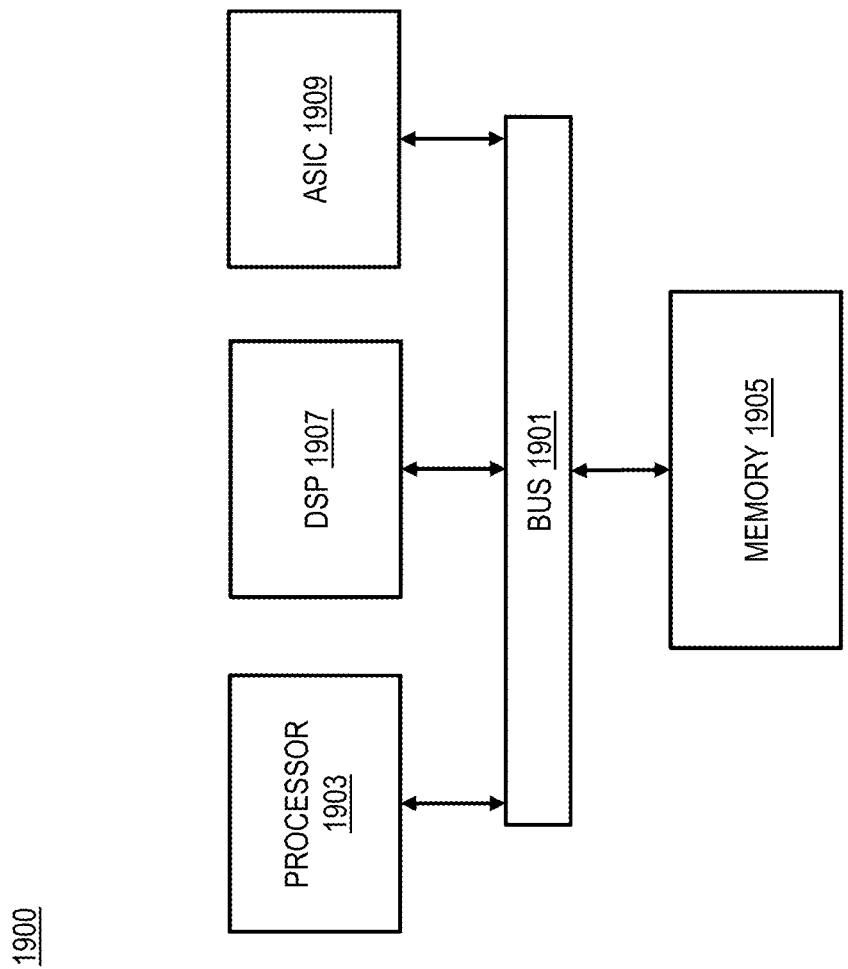
FIG. 19 is a diagram of a chip set that can be used to implement an embodiment of the invention.

FIG. 3 is a flowchart of a process for ranking road links based on danger level information and prioritizing notifications based on the ranking, according to one embodiment. In one embodiment, the notification platform 109 performs the process 300 and is implemented in, for instance, a chip set including a processor and a memory as shown in FIG. 19. Additionally more, fewer, and/or different steps may be provided.

In step 301, the notification platform 109 may determine one or more road links that are associated with at least one curvature value greater than at least one curvature threshold value. In one scenario, a road link may have numerous curves and all the curves need not be dangerous. The notification platform 109 may identify at least one dangerous curve from the plurality of curves in a road link based, at least in part, on a comparison of the curvature value for one or more curves with the curvature threshold value. If the curvature value is greater than the curvature threshold value then a curve is considered dangerous. In one embodiment, the one or more road links are associated with at least one maximum lateral acceleration value greater than a threshold lateral acceleration value. The at least one maximum lateral acceleration value is based, at least in part, on the at least one curvature value and the humanized speed information.

In step 303, the notification platform 109 may determine humanized speed information and speed limit information for the one or more road links. In one embodiment, the speed limit information of the one or more road links is greater than at least one speed limit threshold value, the humanized speed information, or a combination thereof. In one scenario, humanized driving speed is the average probe speed along the road link and may be computed at 10 meters intervals. In another scenario, the speed limit information for at least one road link may be extracted from database 111. The speed limit for a road link remains constant for the entire length of the road. The notification platform 109 may determine a curve to be dangerous if the curvature is high and the speed limit is higher than the humanized speed (i.e. average actual historical speed of vehicles).

In step 305, the notification platform 109 may process and/or facilitate a processing of the at least one curvature value, the humanized speed information, and the speed limit information to determine danger level information for the one or more road links. In one scenario, the notification platform 109 may calculate the danger level for at least one road link by the following formula:

$$\text{danger} = \int_0^{\text{length(curve)}} \left(\frac{m}{h}\right) * c^2$$

NB.length(curve) returns the length of the links within the curve

In one scenario, the notification platform 109 may use the absolute value of the curvature of a road to calculate the danger level instead of the curvature squared.

In step 307, the notification platform 109 may cause, at least in part, a ranking of the one or more road links based, at least in part, on the danger level information. In one scenario, the notification platform 109 may rank curves according to their potential to contribute to danger.

In step 309, the notification platform 109 may cause, at least in part, a prioritization of one or more notifications to one or more vehicles approaching or traveling the one or more road links based, at least in part, on the ranking of the one or more road links. In one embodiment, the one or more notifications include, at least in part, one or more vehicular notifications, one or more traffic broadcasts, or a combination thereof. In one scenario, the notification platform 109 may prioritize curves with the highest danger level while reporting traffic updates. In another scenario, the notification platform 109 may firstly notify the closest vehicle to the highest ranking curve while sending dangerous curve warnings to self-driving vehicles.

Figure 4:
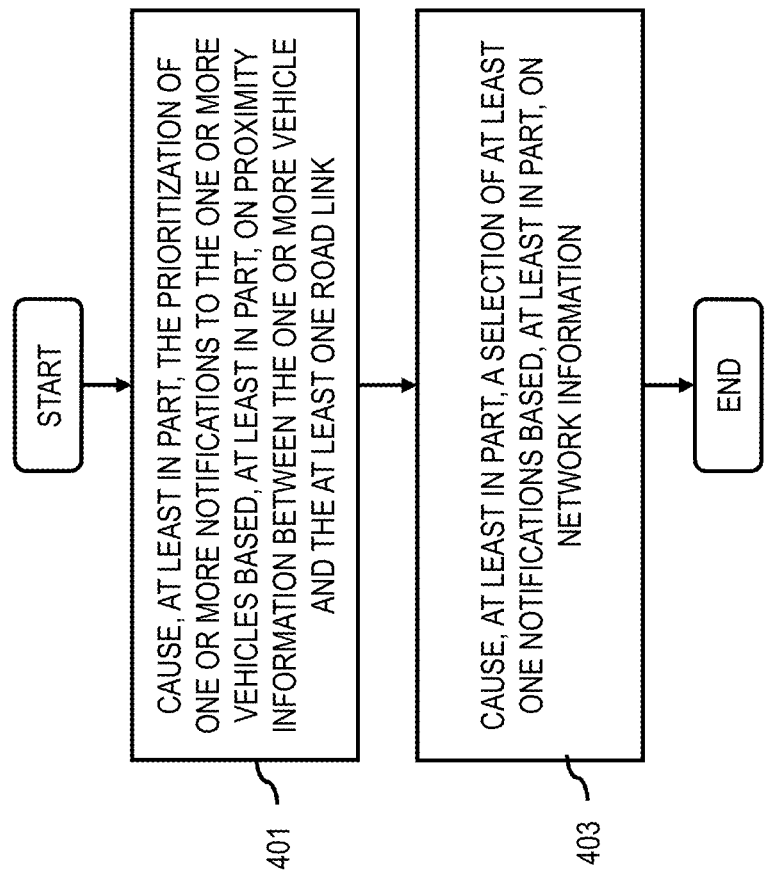
FIG. 4 is a flowchart of a process for prioritizing notification based on proximity information, and selecting notifications based on network information, according to one embodiment.

FIG. 4 is a flowchart of a process for prioritizing notification based on proximity information, and selecting notifications based on network information, according to one embodiment. In one embodiment, the notification platform 109 performs the process 400 and is implemented in, for instance, a chip set including a processor and a memory as shown in FIG. 19. Additionally more, fewer, and/or different steps may be provided.

In step 401, the notification platform 109 may cause, at least in part, the prioritization of one or more notifications to the one or more vehicles based, at least in part, on proximity information between the one or more vehicle and the at least one road link. In one scenario, the notification platform 109 may send dangerous curve warnings to at least one vehicle closest to the highest ranking curve before sending it to other nearby vehicles. Since the vehicles are traveling at a certain speed, a timely alert to the vehicle closest to the most dangerous curve is essential.

In step 403, the notification platform 109 may cause, at least in part, a selection of at least one notifications based, at least in part, on network information. In one scenario, the notification platform 109 primarily selects traffic updates pertaining to the most dangerous road links because channels in a traffic system have limited bandwidth.

Figure 5:
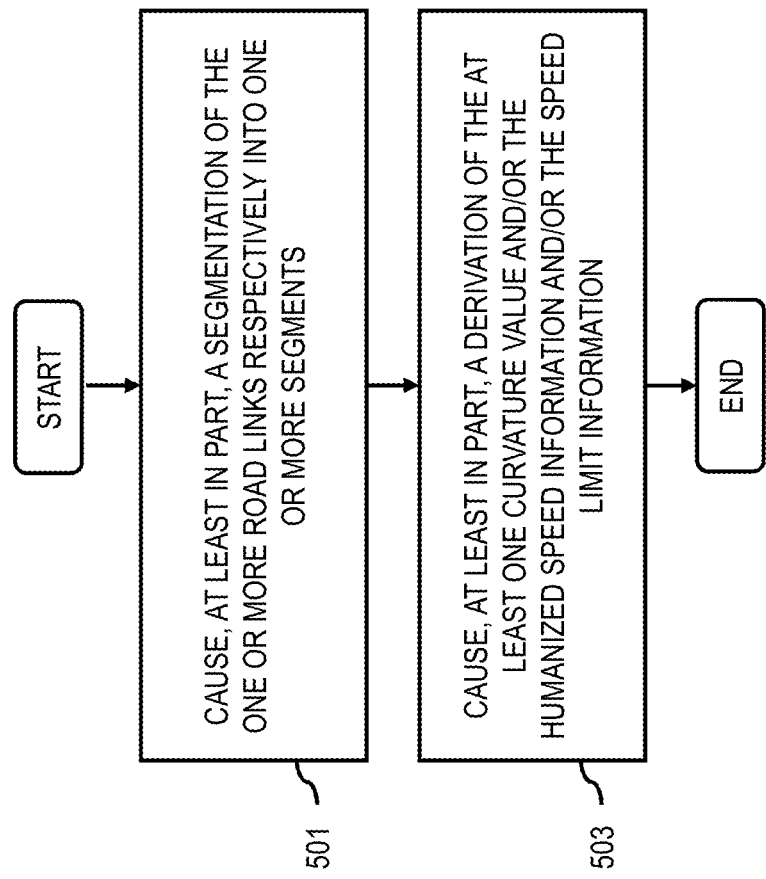
FIG. 5 is a flowchart of a process for determining danger level for road links consisting one or more segments, according to one embodiment.

FIG. 5 is a flowchart of a process for determining danger level for road links consisting one or more segments, according to one embodiment. In one embodiment, the notification platform 109 performs the process 500 and is implemented in, for instance, a chip set including a processor and a memory as shown in FIG. 19. Additionally more, fewer, and/or different steps may be provided.

In step 501, the notification platform 109 may cause, at least in part, a segmentation of the one or more road links respectively into one or more segments. In one scenario, a segmentation strategy may be implemented for a road link wherein the road link may be divided into equal segments.

In step 503, the notification platform 109 may cause, at least in part, a derivation of the at least one curvature value, the humanized speed information, the speed limit information, or a combination based, at least in part, on the segmentation to determine the danger level information for the one or more road links consisting of the one or more segments. In one embodiment, the one or more road links include a plurality of consecutive segments that are associated with the at least one curvature greater than the at least one curvature threshold value.

FIG. 6 is a flowchart of a process for determining granularity of segmentation, according to one embodiment. In one embodiment, the notification platform 109 performs the process 600 and is implemented in, for instance, a chip set including a processor and a memory as shown in FIG. 19. Additionally more, fewer, and/or different steps may be provided.

In step 601, the notification platform 109 may determine a granularity of the segmentation based, at least in part, on a length of the one or more segments. In one scenario, the notification platform 109 may determine the humanized speed information, the speed limit information, or a combination thereof based, at least in part, on the length of one or more segments.

In step 603, the notification platform 109 may cause, at least in part, an alignment of a segmentation for determining the at least one curvature value, the humanized speed information, the speed limit information, or a combination thereof based, at least in part, on the granularity.

In step 605, the notification platform 109 may process and/or facilitate a processing of historical probe data associated with the one or more road links to determine the humanized speed information. In one embodiment, the humanized speed information includes, at least in part, an average speed, a median speed, a mode speed, or a combination thereof. In one scenario, the humanized driving speed may be the average speed and/or the median speed and/or the mode speed in at least one road link. In another scenario, the average speed and/or the median speed and/or the mode speed may be computed using historic probe speed for a certain time period.

FIG. 7A is a graph diagram that represents distance based segmentation for humanized driving, according to one example embodiment. In one scenario, humanized driving speed is computed using historic probe speed (e.g., 3 years back) on a road link. The probe data may be in the form of latitude, longitude, timestamp, heading, speed, etc. A map matching process is used to associate the probe data with a given road link 701. The road link is divided into equal segments 703, 705, 707, 709, and 711 with a size of 20 meters, and an average probe speed is calculated for each individual segment. In another implementation segment sizes can be unequal.

FIG. 7B is a graph diagram that represents humanized speed at segment level, according to one example embodiment. In one scenario, the notification platform 109 may compute humanized speed 713, 715, 717, 719 and 721 for each segment. Then, the notification platform 109 may extract the average probe speed from the plurality of probes that were map matched to that segment.

Figure 8:
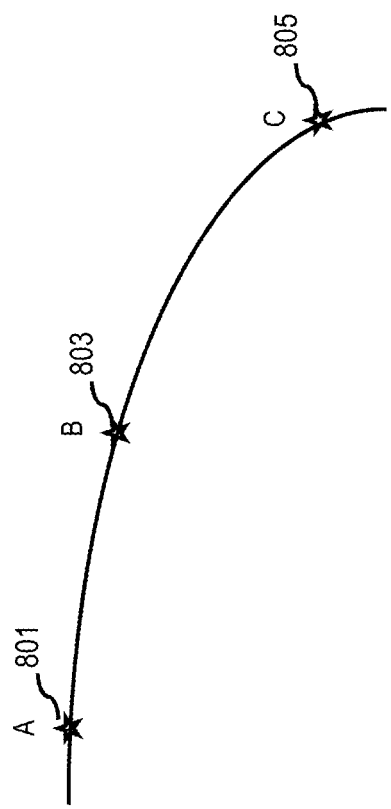
FIG. 8 is a graph diagram that represents a typical road link with three shape points 801, 803 and 805, according to one example embodiment.

FIG. 8 is a graph diagram that represents a typical road link with three shape points 801, 803 and 805, according to one example embodiment. In one scenario, the curvature of a road is computed using the shape points along the road link. The shape points are location points (e.g., latitude/longitude) and are attributes of any road link. Generally road links have several shape points, and curvature is computed at a point using the shape point before and after. In one scenario, the following formula may be used to calculate curvature:

$$\text{curvature} = \frac{\Delta \text{ angle}}{\Delta \text{ arc length}}$$

Since curvature is calculated at the shape point level, it is then extrapolated to the segment level along the road link. For example, if the segmentation of humanized speed was done at the 20 m segment level, then the curvature is extrapolated from the shape point level to the 20 m level. The shape point level is not as granular as the segment level in general. As a result, the curvature is extrapolated to the same segment level as the humanized speed. This brings the curvature at the same granularity in terms of segment distance.

Figure 9:
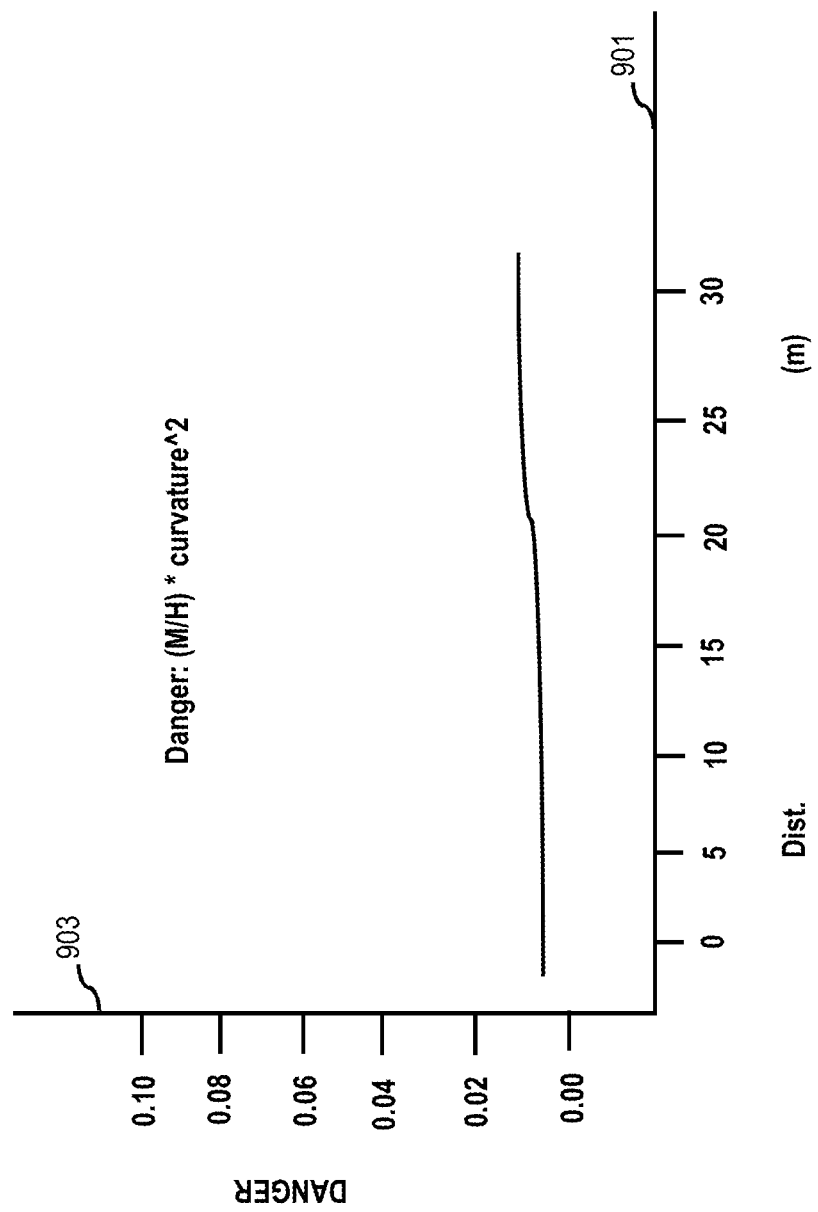
FIG. 9 is a graph diagram for calculation of danger level for at least one road link, according to one example embodiment.

FIG. 9 is a graph diagram for calculation of danger level for at least one road link, according to one example embodiment. In one scenario, the X axis 901 represents a road link with length 30 m. The amount of danger along the road link is computed by the proposed danger function and denoted by the y-axis 903. In FIG. 9, the danger level for a road link is constant from the start to 15 meters, however the danger level increases after 15 meters. There can be number of reasons for the danger level to increase, for example, the road may be straight or has small curvature up to 15 meters but after 15 meters the road is very curvy (i.e., the risk level is high). Another possibility is that at the end of the road link (e.g., 25 meters-30 meters) the ratio of the speed limit to the humanized speed may be higher. In one scenario, the speed limit may be constant for the entire length of the road link but the humanized speed may be lower at the end of the road link. In one scenario, vehicles are slowing down because of unexpected intersections or unsafe curves. Since vehicles are slowing down at the end of the road link the ratio of speed limit of the road link (m) over humanized driving speed (h) is high (i.e., the curvature is high). The danger function denotes the amount of danger associated with a given curve. The total danger of the link is the area under the curve. In one scenario, danger is:

$$\text{Danger:}(c,h,m) \rightarrow \mathbb{R}$$

The intuition of the formula is that a curve is considered dangerous if the curvature is high and the expected speed (i.e., speed limit) is higher than the humanized speed (i.e. average actual historical speed of vehicles outside of congestion). In one scenario, when the speed limit is higher than the humanized driving speed, it shows that drivers cannot navigate these curves at the expected speed limit and if they follow the speed limit then they don't feel safe. In another scenario, the speed limit of the road link is a map attribute and may be obtained from database 111. Specifically, danger is:

$$\text{anger} = \int_0^{\text{length(curve)}} \left(\frac{m}{h}\right) * c^2$$

*NB.length*(curve) returns the length of the links within the curve

In one scenario, the danger function does not use lateral acceleration or the current speed of any individual vehicle. In one scenario, using the danger function, an ordered list of curves according to their danger potential is produced for a geographical area (e.g. city, country, etc.). For example:

| Road link Id | Danger level ranking |
|---|---|
| 123242 | 1 |
| 175656 | 2 |
| 867553 | 3 |
| 975343 | 4 |
| . . . | . . . |

The above referenced table represents a danger level ranking for multiple road links in a geographic location. The higher the danger levels for a road link, the higher the ranking.

Figure 10:
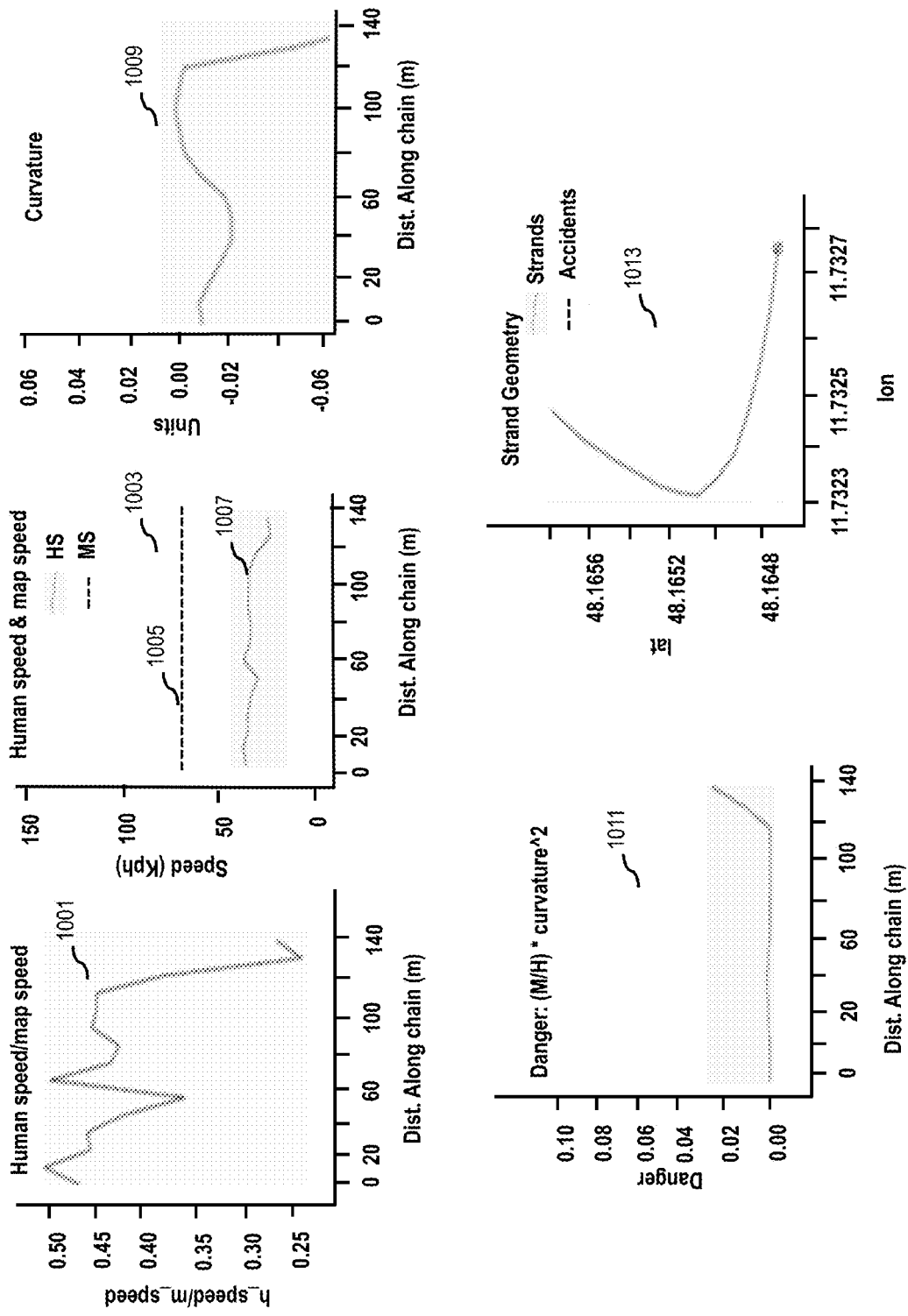
FIG. 10 is a graph diagram that shows attributes of a curve with higher danger potential ranking, according to one example embodiment.

FIG. 10 is a graph diagram that represents a curve with higher danger potential ranking, according to one example embodiment. The graph diagram applies humanized speed, map speed, and curvature in a road link to calculate the danger level. In one scenario, graph 1001 shows the ratio of human speed over the map speed. The ratio of humanized speed to the map speed may be lower (e.g., between distance 100 meters to 130 meters) since the drivers are slowing down because of unexpected intersections or unsafe curves. In another scenario, graph 1003 shows human speed and map speed independently. The map speed 1005 remains constant during the course of a road link, whereas humanized speed 1007 fluctuates depending on the complexities of a road link. In one scenario, human speed is not only the speed of an independent driver, but the average speed of multiple drivers for over several years in one or more road links. In a further scenario, graph 1009 shows the curvature for a road link. A curvature may be computed using consecutive shape points on a road link. The higher the curvature (e.g., between distance 100 meters to 120 meters) the higher is the danger level. In another scenario, graph 1011 computes danger level for a road link, wherein humanized speed derived from historic probes, map speed limit for a road link, and curvature for a road link are calculated to determine the danger level for at least one road link. In another scenario, the graph 1013 shows strand geometry for at least one road link and may designate one or more accident prone area.

Figure 11:
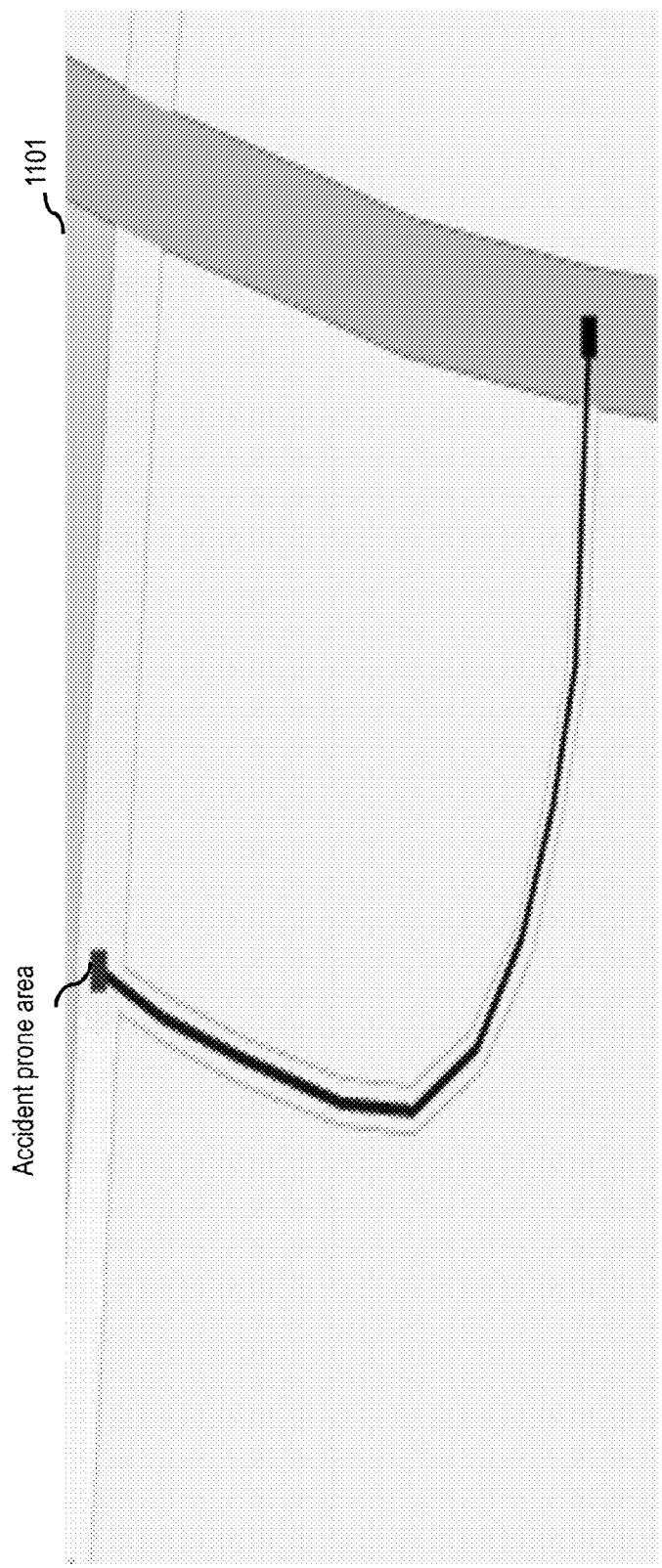
FIG. 11 is a map view of strand geometry for at least one road link, according to one example embodiment.

FIG. 11 is a map view of strand geometry for at least one road link, according to one example embodiment. In one scenario, FIG. 11 highlights an accident prone area 1101 in a road link, thereby alerting one or more drivers. The accident prone area may be determined based, at least in part, on past collision information, danger level information, ranking information, or a combination thereof.

Figure 12:
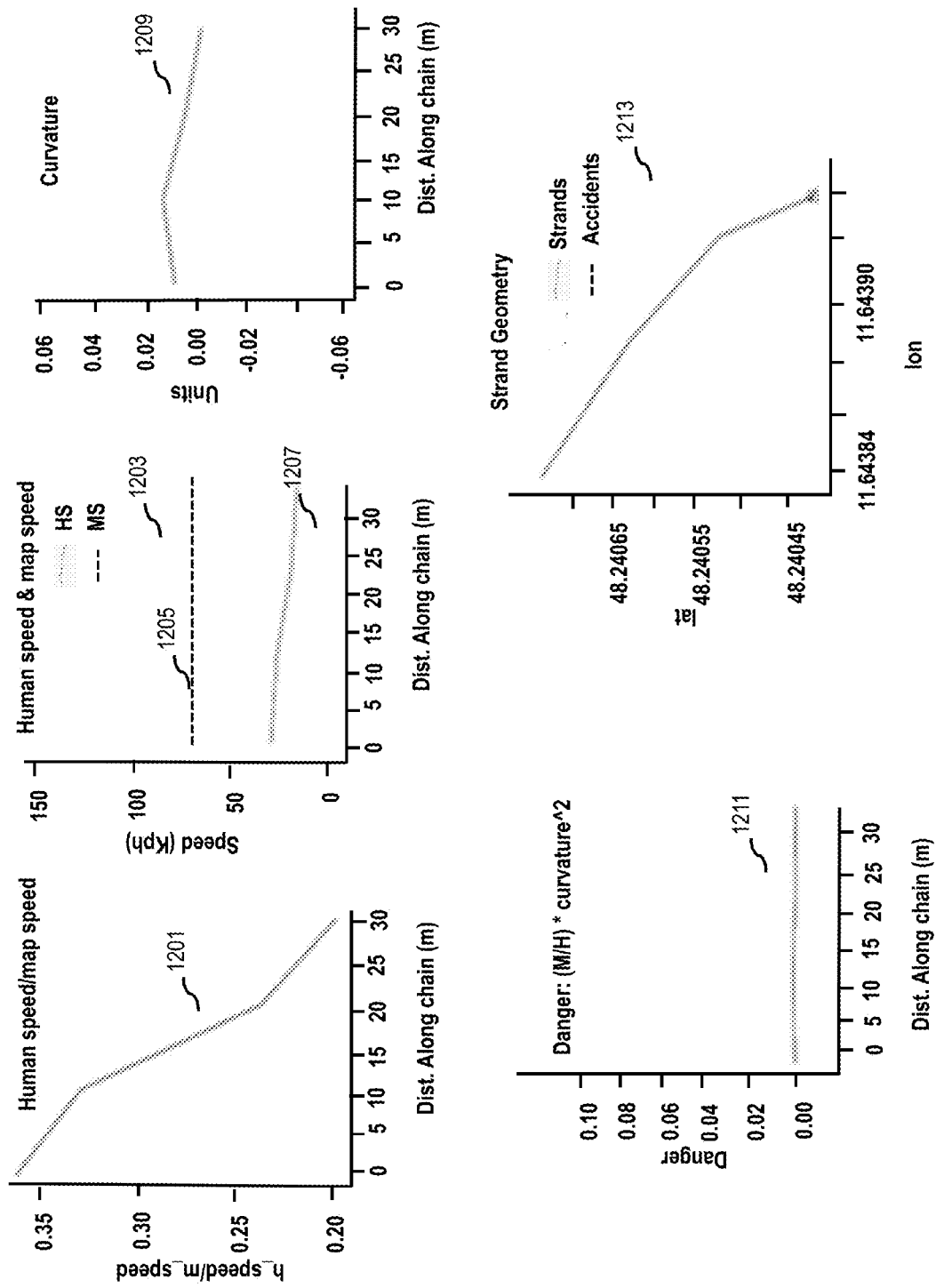
FIG. 12 is a graph diagram that represents curves with low danger potential ranking, according to one example embodiment.

FIG. 12 is a graph diagram that represents curves with low danger potential ranking, according to one example embodiment. In one scenario, graph 1201 shows the ratio of human speed over the map speed. The ratio of humanized speed to the map speed may be lower (e.g., between distance 20 meters to 30 meters) since the drivers are slowing down because of unexpected intersections or unsafe curves. In another scenario, graph 1203 shows human speed and map speed independently. The map speed 1205 remains constant during the course of a road link, whereas humanized speed 1207 fluctuates depending on the complexities of a road link. In a further scenario, graph 1209 shows the curvature for a road link. A curvature may be computed using consecutive shape points on a road link. The higher the curvature (e.g., between distance 8 meters to 12 meters) the higher is the danger level. In another scenario, graph 1211 computes danger level for a road link, wherein humanized speed derived from historic probes, map speed limit for a road link, and curvature for a road link are calculated to determine the danger level for at least one road link. It is determined that the danger level for a road link is low. In another scenario, the graph 1213 shows strand geometry for at least one road link and may designate one or more accident prone area, if any.

Figure 13:
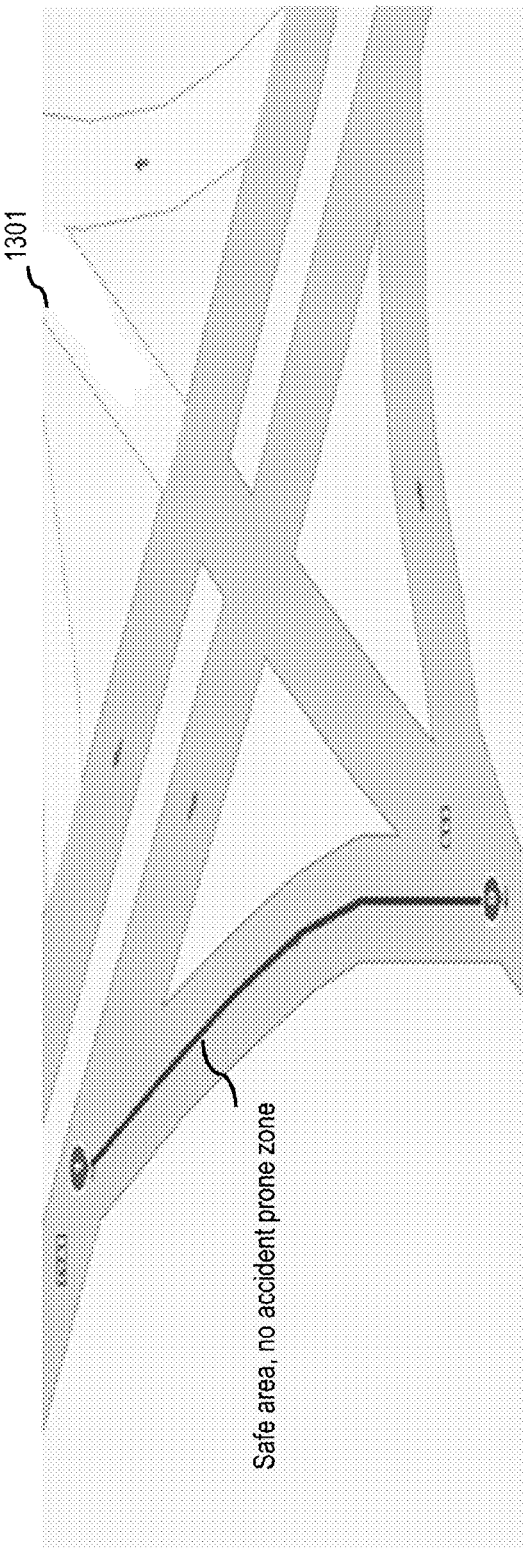
FIG. 13 is a map view of strand geometry for at least one road link, according to one example embodiment.

FIG. 13 is a map view of strand geometry for at least one road link, according to one example embodiment. In one scenario, FIG. 13 highlights that the road link is safe without any accident prone area 1301.

Figure 14:
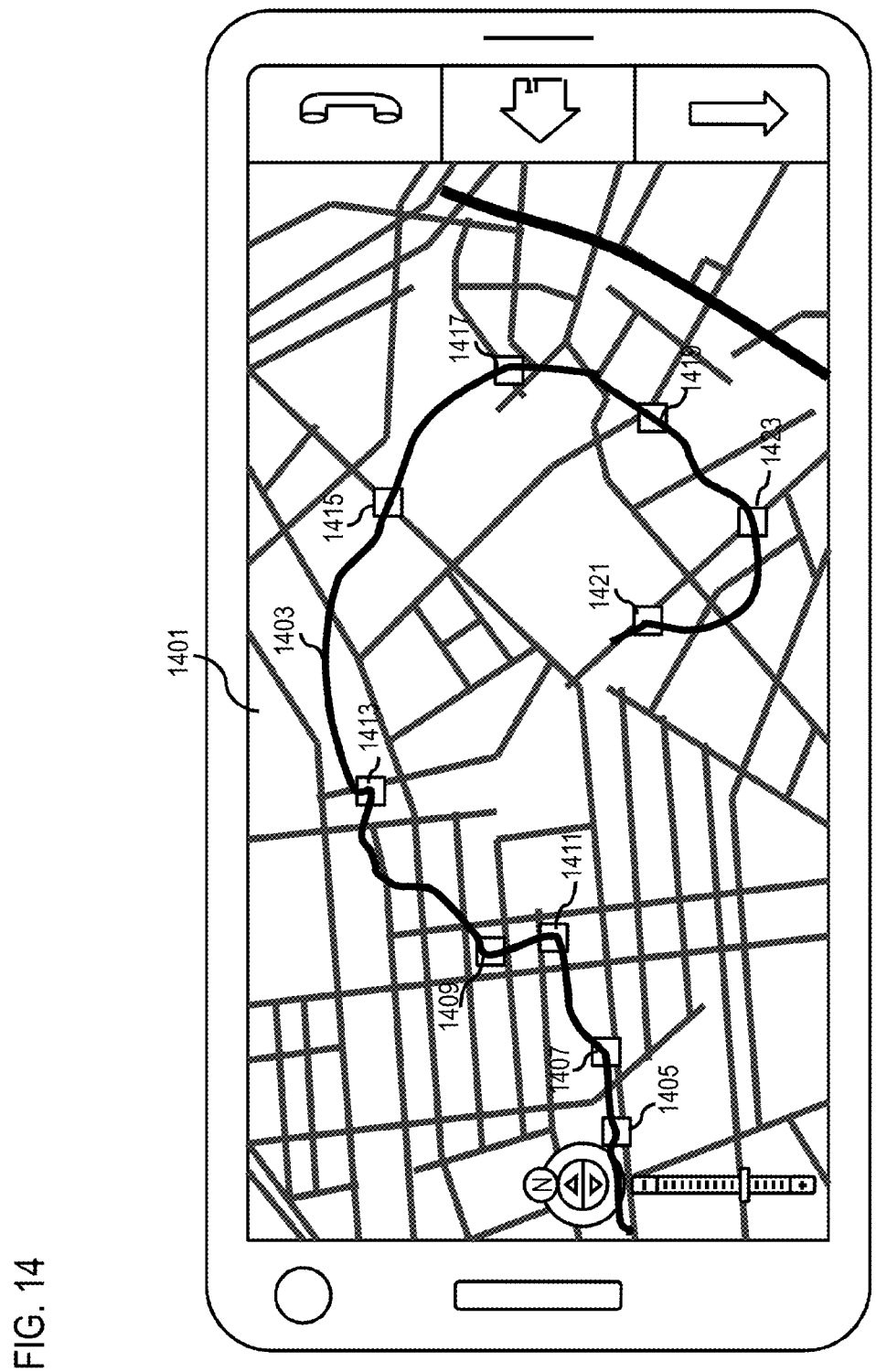
FIG. 14 is a user interface diagram that displays identified dangerous curves in at least one road link, according to one example embodiment.

FIG. 14 is a user interface diagram that displays identified dangerous curves in at least one road link, according to one example embodiment. In one scenario, the notification platform 109 may cause a display of a road link 1403 with 10 identified dangerous curves 1405, 1407, 1409, 1411, 1413, 1415, 1417, 1419, 1421 and 1423 as a mapping user interface 1401 in at least one UE 101. In one scenario, the mapping user interface is interactive, and a user may look at one or more dangerous curves closely by zooming-in. In another scenario, the notification platform 109 may count the number of consecutive road links (nc) which have curvature higher than threshold (cmin), a threshold on lateral acceleration, and speed information for identifying dangerous curves.

Figure 15:
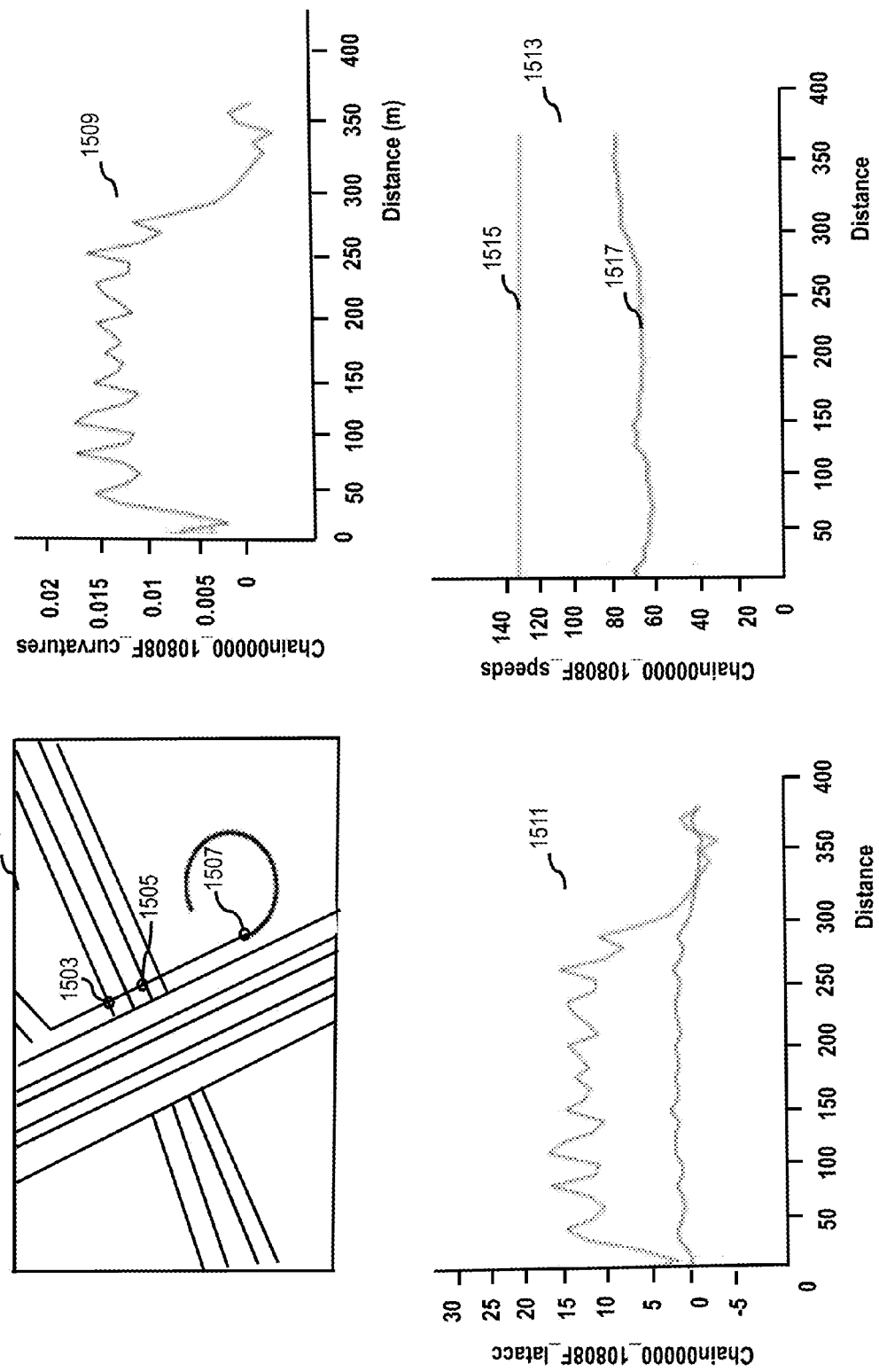
FIG. 15 is a graph diagrams that represents detected dangerous curves with their detailed properties, according to one example embodiment.

FIG. 15 is a graph diagrams that represents detected dangerous curves with their detailed properties, according to one example embodiment. In one scenario, map diagram 1501 represents a mapping interface that displays an identified road link with dots 1503, 1505 and 1507. The dots 1503, 1505 and 1507 represents the reference points for the identified road link, for example, a user may interact with the dots to get more information on the road link. In diagram 1501 the chain may be on the top rank because of the consecutive high number of curvatures. In another scenario, diagram 1509 is a map representation of the identified road link alongside the curvature and the distance. The consecutive high number of curvature between 1 to 350 meters confirms that the road link is dangerous and should be highly ranked. In a further scenario, diagram 1511 is a map representation of the identified road link in lateral acceleration versus distance. The lateral acceleration is obtained from curvature times humanized speed squared. The lateral acceleration correlates curvature with speed, for example, if people drive slowly in a highly curvature area then the area need not be considered dangerous. In another scenario, diagram 1513 is a map representation of the identified road link in terms of speed and distance. In one scenario, the speed limit on the identified road segment 1515 should be higher than the average human speed 1517. This indicates that drivers know that a spot is dangerous so they slow down even if the speed limit is high.

FIG. 16 is a graph diagrams that represents detected dangerous curves with their detailed properties, according to one example embodiment. In one scenario, map diagram 1601 represents a U shaped identified road link 1603 with relatively high speed limit. The sharp curve and the high speed limit generate high lateral acceleration. In another scenario, diagram 1605 is a map representation of the identified road link alongside the curvature and the distance. The consecutive high number of curvature between 150 to 300 meters confirms that the road link is dangerous and should be highly ranked. In a further scenario, diagram 1607 is a map representation of the identified road link in lateral acceleration versus distance. The lateral acceleration is obtained from curvature times humanized speed squared. The lateral acceleration correlates curvature with speed. In another scenario, diagram 1609 is a map representation of the identified road link in terms of speed and distance. In one scenario, the speed limit on the identified road segment should be higher than the average human speed.

Figure 17:
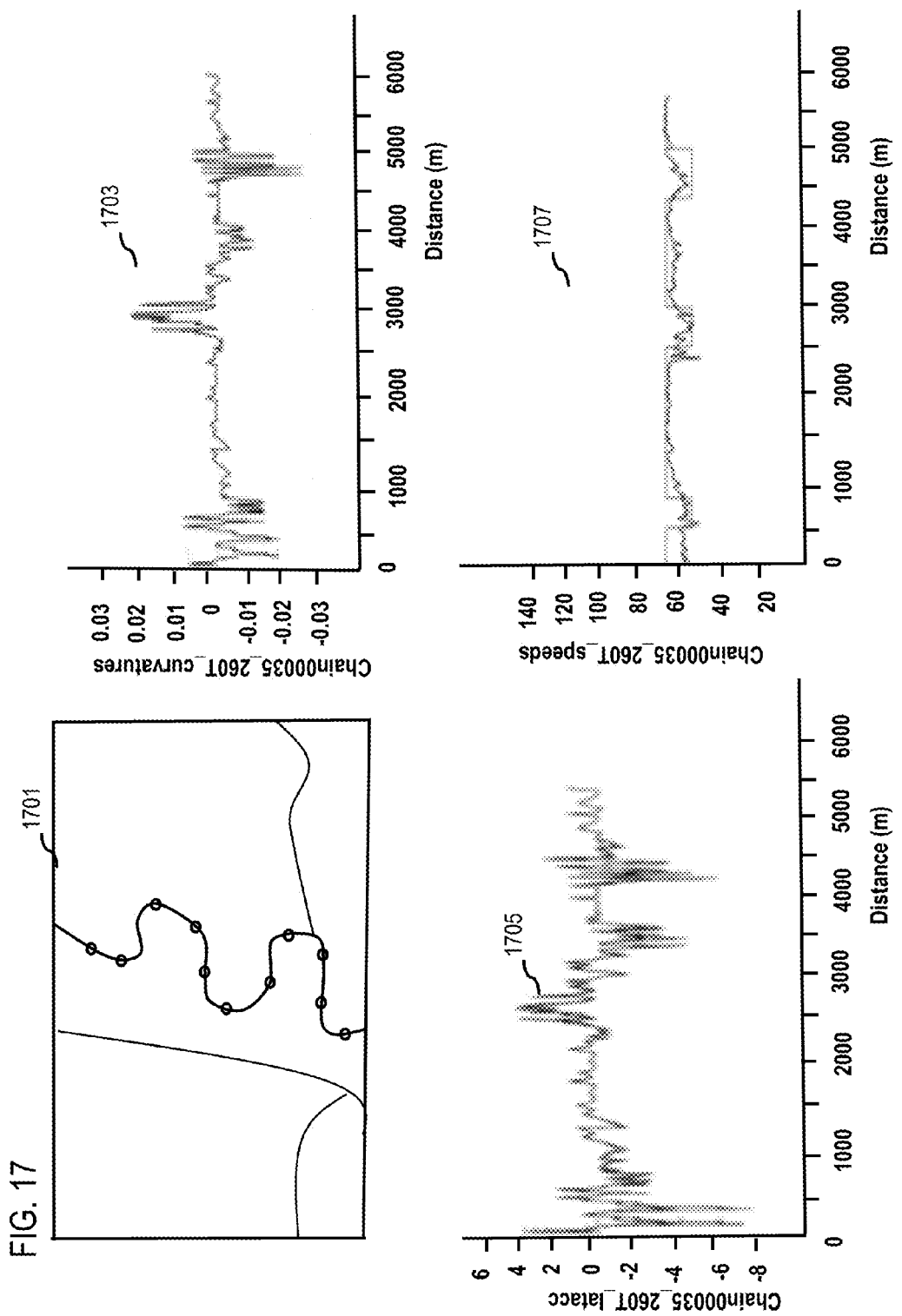
FIG. 17 is a graph diagrams that represents detected dangerous curves with their detailed properties, according to one example embodiment.

FIG. 17 is a graph diagrams that represents detected dangerous curves with their detailed properties, according to one example embodiment. In one scenario, map diagram 1701 represents a road link comprising of very high curvature spots with high lateral acceleration. In another scenario, diagram 1703 is a map representation of the identified road link alongside the curvature and the distance. In a further scenario, diagram 1705 is a map representation of the identified road link in lateral acceleration versus distance. In another scenario, diagram 1707 is a map representation of the identified road link in terms of speed and distance. The speed limit and the human driving speed are the same. In another implementation, a dangerous curve may be identified by taking the first derivative of the lateral acceleration. The first derivative supports the intuition that a curve is dangerous when the vehicle changes from a straight line trajectory to one that is bent.

The processes described herein for prioritizing notification to one or more vehicles based on the ranking of one or more road links may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 18:
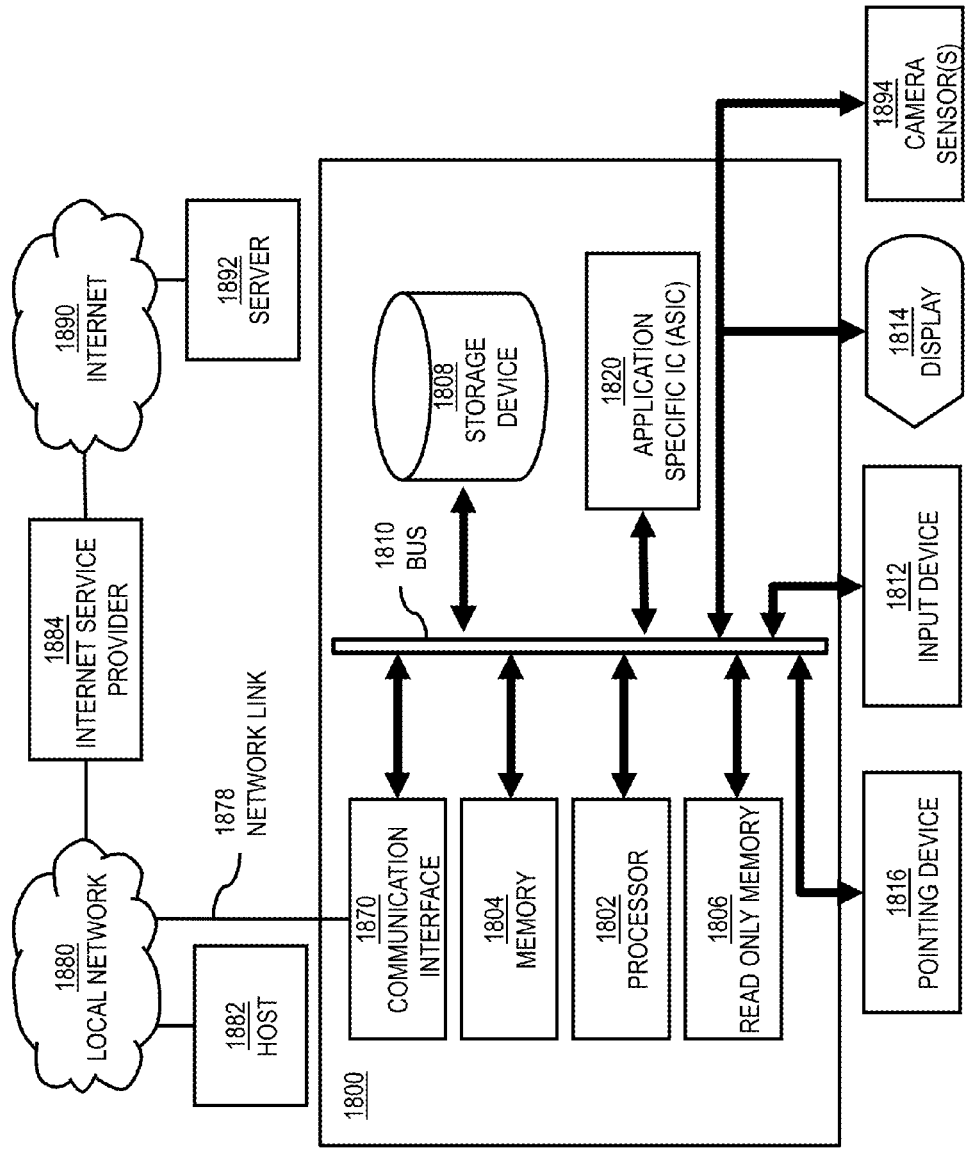
FIG. 18 is a diagram of hardware that can be used to implement an embodiment of the invention.

FIG. 18 illustrates a computer system 1800 upon which an embodiment of the invention may be implemented. Although computer system 1800 is depicted with respect to a particular device or equipment, it is contemplated that other devices or equipment (e.g., network elements, servers, etc.) within FIG. 18 can deploy the illustrated hardware and components of system 1800. Computer system 1800 is programmed (e.g., via computer program code or instructions) to prioritize notification to one or more vehicles based on the ranking of one or more road links as described herein and includes a communication mechanism such as a bus 1810 for passing information between other internal and external components of the computer system 1800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1800, or a portion thereof, constitutes a means for performing one or more steps of prioritizing notification to one or more vehicles based on the ranking of one or more road links.

A bus 1810 includes one or more parallel conductors of information so that information is transferred quickly among devices coupled to the bus 1810. One or more processors 1802 for processing information are coupled with the bus 1810.

A processor (or multiple processors) 1802 performs a set of operations on information as specified by computer program code related to prioritizing notification to one or more vehicles based on the ranking of one or more road links. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1810 and placing information on the bus 1810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1802, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1800 also includes a memory 1804 coupled to bus 1810. The memory 1804, such as a random access memory (RAM) or any other dynamic storage device, stores information including processor instructions for prioritizing notification to one or more vehicles based on the ranking of one or more road links. Dynamic memory allows information stored therein to be changed by the computer system 1800. RAM allows a unit of information stored at a location called a memory address to be stored and retrieved independently of information at neighboring addresses. The memory 1804 is also used by the processor 1802 to store temporary values during execution of processor instructions. The computer system 1800 also includes a read only memory (ROM) 1806 or any other static storage device coupled to the bus 1810 for storing static information, including instructions, that is not changed by the computer system 1800. Some memory is composed of volatile storage that loses the information stored thereon when power is lost. Also coupled to bus 1810 is a non-volatile (persistent) storage device 1808, such as a magnetic disk, optical disk or flash card, for storing information, including instructions, that persists even when the computer system 1800 is turned off or otherwise loses power.

Information, including instructions for prioritizing notification to one or more vehicles based on the ranking of one or more road links, is provided to the bus 1810 for use by the processor from an external input device 1812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1800. Other external devices coupled to bus 1810, used primarily for interacting with humans, include a display device 1814, such as a cathode ray tube (CRT), a liquid crystal display (LCD), a light emitting diode (LED) display, an organic LED (OLED) display, a plasma screen, or a printer for presenting text or images, and a pointing device 1816, such as a mouse, a trackball, cursor direction keys, or a motion sensor, for controlling a position of a small cursor image presented on the display 1814 and issuing commands associated with graphical elements presented on the display 1814, and one or more camera sensors 1894 for capturing, recording and causing to store one or more still and/or moving images (e.g., videos, movies, etc.) which also may comprise audio recordings. In some embodiments, for example, in embodiments in which the computer system 1800 performs all functions automatically without human input, one or more of external input device 1812, display device 1814 and pointing device 1816 may be omitted.

In the illustrated embodiment, special purpose hardware, such as an application specific integrated circuit (ASIC) 1820, is coupled to bus 1810. The special purpose hardware is configured to perform operations not performed by processor 1802 quickly enough for special purposes. Examples of ASICs include graphics accelerator cards for generating images for display 1814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1800 also includes one or more instances of a communications interface 1870 coupled to bus 1810. Communication interface 1870 provides a one-way or two-way communication coupling to a variety of external devices that operate with their own processors, such as printers, scanners and external disks. In general the coupling is with a network link 1878 that is connected to a local network 1880 to which a variety of external devices with their own processors are connected. For example, communication interface 1870 may be a parallel port or a serial port or a universal serial bus (USB) port on a personal computer. In some embodiments, communications interface 1870 is an integrated services digital network (ISDN) card or a digital subscriber line (DSL) card or a telephone modem that provides an information communication connection to a corresponding type of telephone line. In some embodiments, a communication interface 1870 is a cable modem that converts signals on bus 1810 into signals for a communication connection over a coaxial cable or into optical signals for a communication connection over a fiber optic cable. As another example, communications interface 1870 may be a local area network (LAN) card to provide a data communication connection to a compatible LAN, such as Ethernet. Wireless links may also be implemented. For wireless links, the communications interface 1870 sends or receives or both sends and receives electrical, acoustic or electromagnetic signals, including infrared and optical signals, that carry information streams, such as digital data. For example, in wireless handheld devices, such as mobile telephones like cell phones, the communications interface 1870 includes a radio band electromagnetic transmitter and receiver called a radio transceiver. In certain embodiments, the communications interface 1870 enables connection to the communication network 107 for prioritizing notification to one or more vehicles based on the ranking of one or more road links to the UE 101.

The term "computer-readable medium" as used herein refers to any medium that participates in providing information to processor 1802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1808. Volatile media include, for example, dynamic memory 1804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1820.

Network link 1878 typically provides information communication using transmission media through one or more networks to other devices that use or process the information. For example, network link 1878 may provide a connection through local network 1880 to a host computer 1882 or to equipment 1884 operated by an Internet Service Provider (ISP). ISP equipment 1884 in turn provides data communication services through the public, world-wide packet-switching communication network of networks now commonly referred to as the Internet 1890.

A computer called a server host 1892 connected to the Internet hosts a process that provides a service in response to information received over the Internet. For example, server host 1892 hosts a process that provides information representing video data for presentation at display 1814. It is contemplated that the components of system 1800 can be deployed in various configurations within other computer systems, e.g., host 1882 and server 1892.

At least some embodiments of the invention are related to the use of computer system 1800 for implementing some or all of the techniques described herein. According to one embodiment of the invention, those techniques are performed by computer system 1800 in response to processor 1802 executing one or more sequences of one or more processor instructions contained in memory 1804. Such instructions, also called computer instructions, software and program code, may be read into memory 1804 from another computer-readable medium such as storage device 1808 or network link 1878. Execution of the sequences of instructions contained in memory 1804 causes processor 1802 to perform one or more of the method steps described herein. In alternative embodiments, hardware, such as ASIC 1820, may be used in place of or in combination with software to implement the invention. Thus, embodiments of the invention are not limited to any specific combination of hardware and software, unless otherwise explicitly stated herein.

The signals transmitted over network link 1878 and other networks through communications interface 1870, carry information to and from computer system 1800. Computer system 1800 can send and receive information, including program code, through the networks 1880, 1890 among others, through network link 1878 and communications interface 1870. In an example using the Internet 1890, a server host 1892 transmits program code for a particular application, requested by a message sent from computer 1800, through Internet 1890, ISP equipment 1884, local network 1880 and communications interface 1870. The received code may be executed by processor 1802 as it is received, or may be stored in memory 1804 or in storage device 1808 or any other non-volatile storage for later execution, or both. In this manner, computer system 1800 may obtain application program code in the form of signals on a carrier wave.

Various forms of computer readable media may be involved in carrying one or more sequence of instructions or data or both to processor 1802 for execution. For example, instructions and data may initially be carried on a magnetic disk of a remote computer such as host 1882. The remote computer loads the instructions and data into its dynamic memory and sends the instructions and data over a telephone line using a modem. A modem local to the computer system 1800 receives the instructions and data on a telephone line and uses an infra-red transmitter to convert the instructions and data to a signal on an infra-red carrier wave serving as the network link 1878. An infrared detector serving as communications interface 1870 receives the instructions and data carried in the infrared signal and places information representing the instructions and data onto bus 1810. Bus 1810 carries the information to memory 1804 from which processor 1802 retrieves and executes the instructions using some of the data sent with the instructions. The instructions and data received in memory 1804 may optionally be stored on storage device 1808, either before or after execution by the processor 1802.

FIG. 19 illustrates a chip set or chip 1900 upon which an embodiment of the invention may be implemented. Chip set 1900 is programmed to prioritize notification to one or more vehicles based on the ranking of one or more road links as described herein and includes, for instance, the processor and memory components described with respect to FIG. 18 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1900 can be implemented in a single chip. It is further contemplated that in certain embodiments the chip set or chip 1900 can be implemented as a single "system on a chip." It is further contemplated that in certain embodiments a separate ASIC would not be used, for example, and that all relevant functions as disclosed herein would be performed by a processor or processors. Chip set or chip 1900, or a portion thereof, constitutes a means for performing one or more steps of providing user interface navigation information associated with the availability of functions. Chip set or chip 1900, or a portion thereof, constitutes a means for performing one or more steps of prioritizing notification to one or more vehicles based on the ranking of one or more road links.

In one embodiment, the chip set or chip 1900 includes a communication mechanism such as a bus 1901 for passing information among the components of the chip set 1900. A processor 1903 has connectivity to the bus 1901 to execute instructions and process information stored in, for example, a memory 1905. The processor 1903 may include one or more processing cores with each core configured to perform independently. A multi-core processor enables multiprocessing within a single physical package. Examples of a multi-core processor include two, four, eight, or greater numbers of processing cores. Alternatively or in addition, the processor 1903 may include one or more microprocessors configured in tandem via the bus 1901 to enable independent execution of instructions, pipelining, and multithreading. The processor 1903 may also be accompanied with one or more specialized components to perform certain processing functions and tasks such as one or more digital signal processors (DSP) 1907, or one or more application-specific integrated circuits (ASIC) 1909. A DSP 1907 typically is configured to process real-world signals (e.g., sound) in real time independently of the processor 1903. Similarly, an ASIC 1909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1900 includes merely one or more processors and some software and/or firmware supporting and/or relating to and/or for the one or more processors.

The processor 1903 and accompanying components have connectivity to the memory 1905 via the bus 1901. The memory 1905 includes both dynamic memory (e.g., RAM, magnetic disk, writable optical disk, etc.) and static memory (e.g., ROM, CD-ROM, etc.) for storing executable instructions that when executed perform the inventive steps described herein to prioritize notification to one or more vehicles based on the ranking of one or more road links. The memory 1905 also stores the data associated with or generated by the execution of the inventive steps.

Figure 20:
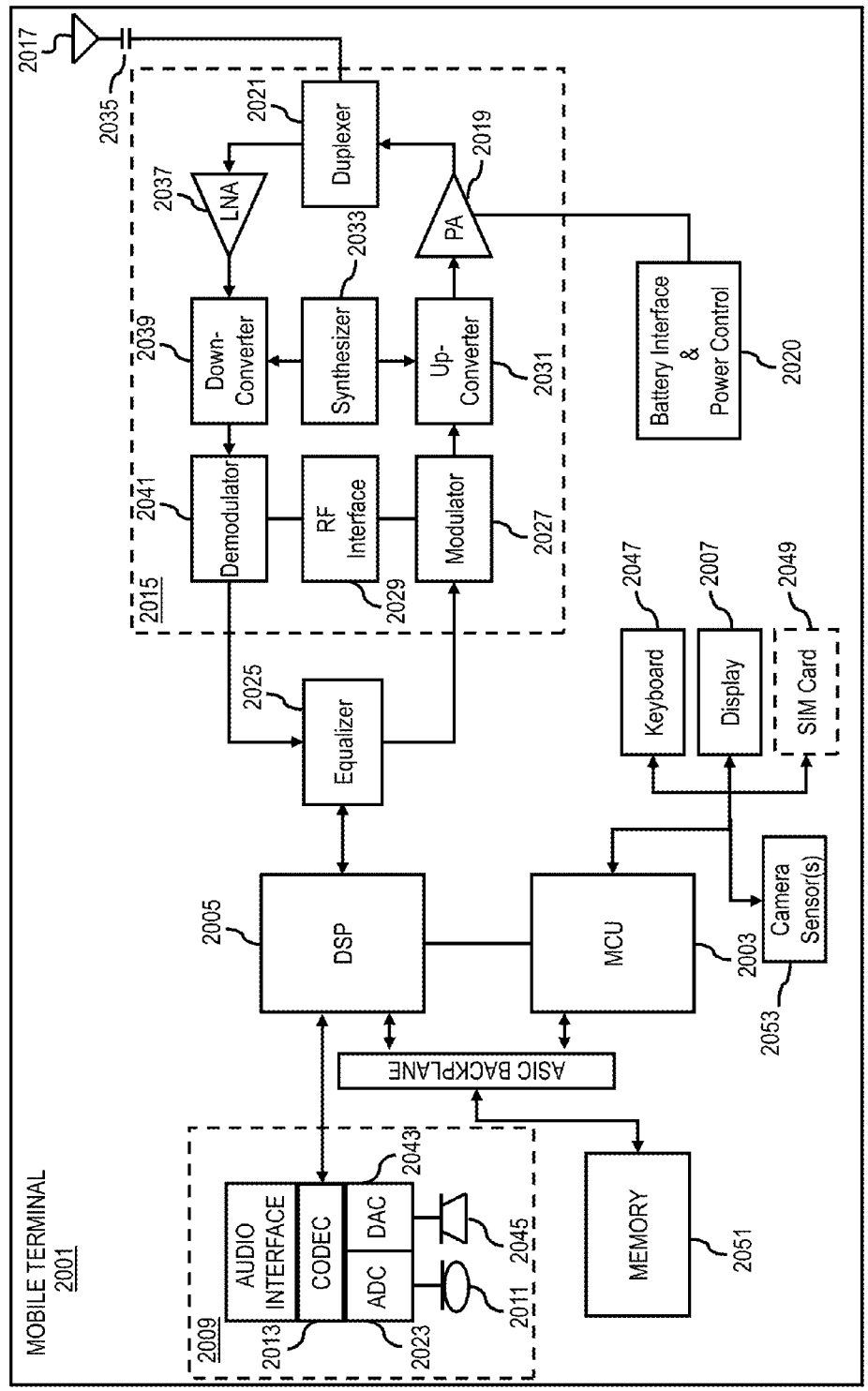
FIG. 20 is a diagram of a mobile terminal (e.g., handset) that can be used to implement an embodiment of the invention.

FIG. 20 is a diagram of exemplary components of a mobile terminal (e.g., handset) for communications, which is capable of operating in the system of FIG. 1A, according to one embodiment. In some embodiments, mobile terminal 2001, or a portion thereof, constitutes a means for performing one or more steps of prioritizing notification to one or more vehicles based on the ranking of one or more road links. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 2003, a Digital Signal Processor (DSP) 2005, and a receiver/transmitter unit including a microphone gain control unit and a speaker gain control unit. A main display unit 2007 provides a display to the user in support of various applications and mobile terminal functions that perform or support the steps of prioritizing notification to one or more vehicles based on the ranking of one or more road links. The display 2007 includes display circuitry configured to display at least a portion of a user interface of the mobile terminal (e.g., mobile telephone). Additionally, the display 2007 and display circuitry are configured to facilitate user control of at least some functions of the mobile terminal. An audio function circuitry 2009 includes a microphone 2011 and microphone amplifier that amplifies the speech signal output from the microphone 2011. The amplified speech signal output from the microphone 2011 is fed to a coder/decoder (CODEC) 2013.

A radio section 2015 amplifies power and converts frequency in order to communicate with a base station, which is included in a mobile communication system, via antenna 2017. The power amplifier (PA) 2019 and the transmitter/modulation circuitry are operationally responsive to the MCU 2003, with an output from the PA 2019 coupled to the duplexer 2021 or circulator or antenna switch, as known in the art. The PA 2019 also couples to a battery interface and power control unit 2020.

In use, a user of mobile terminal 2001 speaks into the microphone 2011 and his or her voice along with any detected background noise is converted into an analog voltage. The analog voltage is then converted into a digital signal through the Analog to Digital Converter (ADC) 2023. The control unit 2003 routes the digital signal into the DSP 2005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 2025 for compensation of any frequency-dependent impairments that occur during transmission though the air such as phase and amplitude distortion. After equalizing the bit stream, the modulator 2027 combines the signal with a RF signal generated in the RF interface 2029. The modulator 2027 generates a sine wave by way of frequency or phase modulation. In order to prepare the signal for transmission, an up-converter 2031 combines the sine wave output from the modulator 2027 with another sine wave generated by a synthesizer 2033 to achieve the desired frequency of transmission. The signal is then sent through a PA 2019 to increase the signal to an appropriate power level. In practical systems, the PA 2019 acts as a variable gain amplifier whose gain is controlled by the DSP 2005 from information received from a network base station. The signal is then filtered within the duplexer 2021 and optionally sent to an antenna coupler 2035 to match impedances to provide maximum power transfer. Finally, the signal is transmitted via antenna 2017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 2001 are received via antenna 2017 and immediately amplified by a low noise amplifier (LNA) 2037. A down-converter 2039 lowers the carrier frequency while the demodulator 2041 strips away the RF leaving only a digital bit stream. The signal then goes through the equalizer 2025 and is processed by the DSP 2005. A Digital to Analog Converter (DAC) 2043 converts the signal and the resulting output is transmitted to the user through the speaker 2045, all under control of a Main Control Unit (MCU) 2003 which can be implemented as a Central Processing Unit (CPU).

The MCU 2003 receives various signals including input signals from the keyboard 2047. The keyboard 2047 and/or the MCU 2003 in combination with other user input components (e.g., the microphone 2011) comprise a user interface circuitry for managing user input. The MCU 2003 runs a user interface software to facilitate user control of at least some functions of the mobile terminal 2001 to prioritize notification to one or more vehicles based on the ranking of one or more road links. The MCU 2003 also delivers a display command and a switch command to the display 2007 and to the speech output switching controller, respectively. Further, the MCU 2003 exchanges information with the DSP 2005 and can access an optionally incorporated SIM card 2049 and a memory 2051. In addition, the MCU 2003 executes various control functions required of the terminal. The DSP 2005 may, depending upon the implementation, perform any of a variety of conventional digital processing functions on the voice signals. Additionally, D S P 2005 determines the background noise level of the local environment from the signals detected by microphone 2011 and sets the gain of microphone 2011 to a level selected to compensate for the natural tendency of the user of the mobile terminal 2001.

The CODEC 2013 includes the ADC 2023 and DAC 2043. The memory 2051 stores various data including call incoming tone data and is capable of storing other data including music data received via, e.g., the global Internet. The software module could reside in RAM memory, flash memory, registers, or any other form of writable storage medium known in the art. The memory device 2051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 2049 carries, for instance, important information, such as the cellular phone number, the carrier supplying service, subscription details, and security information. The SIM card 2049 serves primarily to identify the mobile terminal 2001 on a radio network. The card 2049 also contains a memory for storing a personal telephone number registry, text messages, and user specific mobile terminal settings.

Further, one or more camera sensors 2053 may be incorporated onto the mobile station 2001 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
 processing geographical feature data originating from a geographic database and historical probe data associated with a geographical area;
 determining, utilizing one or more processors, a plurality of road links of a vehicular driving route associated with the geographical area based on the processed geographical feature data,
  wherein the determining of the plurality of road links includes determining, based at least in part on a length of the respective road link, at least one respective curvature value of respective road links in the plurality of road links,
  wherein the respective curvature values are determined based on the geographical feature data,
  wherein at least one of the plurality of road links is associated with at least one curvature value greater than at least one curvature threshold value;
 determining humanized speed information, based on the processed historical probe data, and speed limit information associated with respective road links of the plurality of road links;
 determining danger level information associated with at least two of the plurality of road links,
  wherein the determined danger level information associated with a respective road link of the at least two of the plurality of road links is determined based on processing the length of the respective road link, the at least one curvature value associated with the respective road links from the processed geographical feature data, the at least one curvature threshold value, the humanized speed information associated with the respective road links, and the speed limit information associated with the respective road links of the plurality of road links;

determining a ranking of at least two road links of the plurality of road links based, at least in part, on the determined danger level information;

generating a plurality of notifications with notice information based on the determined danger level information associated with the at least two road links of the plurality of road links;

determining two or more vehicles approaching or traveling one or more road links of the plurality of road links, wherein the determining of the two or more vehicles includes determining proximity information of the two or more vehicles with respect to the one or more road links of the plurality of road links;

determining a prioritizing of the plurality of notifications to the two or more vehicles approaching or traveling the road links based, at least in part, on the ranking of the road links, wherein a first road link including a first curve with a highest danger level is reported before other road links including curves with danger levels lower than the first road link; and transmitting, based on the determined prioritizing and the determined proximity information, the notifications to the two or more vehicles.

2. A method of claim 1, wherein the notifications include, at least in part, one or more vehicular notifications, one or more traffic broadcasts, or a combination thereof.

3. A method of claim 1, further comprising:
selecting at least one notification.

4. A method of claim 1, further comprising:
segmenting the road links respectively into a plurality of segments; and
deriving the at least one curvature value, the humanized speed information, the speed limit information, or a combination based, at least in part, on the segmenting to determine the danger level information for the road links consisting of the segments.

5. A method of claim 1, further comprising:
determining a granularity of the segmentation based, at least in part, on a length of the segments; and
aligning a segmentation for determining the at least one curvature value, the humanized speed information, the speed limit information, or a combination thereof based, at least in part, on the granularity.

6. A method of claim 1, further comprising:
processing historical probe data associated with the road links to determine the humanized speed information,
wherein the humanized speed information includes, at least in part, an average speed, a median speed, a mode speed, or a combination thereof.

7. A method of claim 1, wherein the road links include a plurality of consecutive segments that are associated with the at least one curvature greater than the at least one curvature threshold value.

8. A method of claim 1, wherein the road links are associated with at least one maximum lateral acceleration value greater than a threshold lateral acceleration value, and wherein the at least one maximum lateral acceleration value is based, at least in part, on the at least one curvature value and the humanized speed information.

9. A method of claim 1, wherein the speed limit information of the road links is greater than at least one speed limit threshold value, the humanized speed information, or a combination thereof.

10. An apparatus comprising:
at least one processor; and
at least one memory including computer program code for one or more programs,
the at least one memory and the computer program code configured to, with the at least one processor, cause the apparatus to perform at least the following:
process geographical feature data originating from a geographic database and historical probe data associated with a geographical area,
determine a plurality of road links of a vehicular driving route associated with the geographical area based on the processed geographical feature data,
wherein the determining of the plurality of road links includes determining, based at least in part on a length of the respective road link, at least one respective curvature value of respective road links in the plurality of road links,
wherein the respective curvature values are determined based on the geographical feature data,
wherein at least one of the plurality of road links is associated with at least one curvature value greater than at least one curvature threshold value,
determine humanized speed information, based on the processed historical probe data, and speed limit information associated with respective road links of the plurality of road links,
determine danger level information associated with at least two of the plurality of road links,
wherein the determined danger level information associated with a respective road link of the at least two of the plurality of road links is determined based on processing the length of the respective road link, the at least one curvature value associated with the respective road links from the processed geographical feature data, the at least one curvature threshold value, the humanized speed information associated with the respective road links, and the speed limit information associated with the respective road links of the plurality of road links,
determine a ranking of at least two road links of the plurality of road links based, at least in part, on the determined danger level information;
generate a plurality of notifications with notice information based on the determined danger level information associated with the at least two road links of the plurality of road links;
determine two or more vehicles approaching or traveling one or more road links of the plurality of road links,
wherein the determining of the two or more vehicles includes determining proximity information of the two or more vehicles with respect to the one or more road links of the plurality of road links,
determine a prioritizing of the plurality of notifications to the two or more vehicles approaching or traveling the road links based, at least in part, on the ranking of the road links,
wherein a first road link including a first curve with a highest danger level is reported before other road links including curves with danger levels lower than the first road link; and transmit, based on the determined prioritizing and the determined proximity information, the notifications to the two or more vehicles.

11. An apparatus of claim 10, wherein the notifications include, at least in part, one or more vehicular notifications, one or more traffic broadcasts, or a combination thereof.

12. An apparatus of claim 10, wherein the apparatus is further caused to:
select the notifications.

13. An apparatus of claim 10, wherein the apparatus is further caused to:
segment the one or more road links respectively into a plurality of segments; and
derive the at least one curvature value, the humanized speed information, the speed limit information, or a combination based, at least in part, on the segmentation to determine the danger level information for the road links consisting of the segments.

14. An apparatus of claim 10, wherein the apparatus is further caused to:
determine a granularity of the segmentation based, at least in part, on a length of the segments; and
align a segmentation for determining the at least one curvature value, the humanized speed information, the speed limit information, or a combination thereof based, at least in part, on the granularity.

15. An apparatus of claim 10, wherein the apparatus is further caused to:
process historical probe data associated with the road links to determine the humanized speed information, wherein the humanized speed information includes, at least in part, an average speed, a median speed, a mode speed, or a combination thereof.

16. A non-transitory computer-readable storage medium carrying one or more sequences of one or more instructions which, when executed by one or more processors, cause an apparatus to at least perform the following steps:
processing geographical feature data originating from a geographic database and historical probe data associated with a geographical area,
determining a plurality of road links of a vehicular driving route associated with the geographical area based on the processed geographical feature data,
wherein the determining of the plurality of road links includes determining, based at least in part on a length of the respective road link, at least one respective curvature value of respective road links in the plurality of road links,
wherein the respective curvature values are determined based on the geographical feature data,
wherein at least one of the plurality of road links is associated with at least one curvature value greater than at least one curvature threshold value,
determining humanized speed information, based on the processed historical probe data, and speed limit information associated with respective road links of the plurality of road links,
determining danger level information associated with at least two of the plurality of road links,
wherein the determined danger level information associated with a respective road link of the at least two of the plurality of road links is determined based on processing the length of the respective road link, the at least one curvature value associated with the respective road links from the processed geographical feature data, the at least one curvature threshold value, the humanized speed information associated with the respective road links, and the speed limit information associated with the respective road links of the plurality of road links,
determining a ranking of at least two road links of the plurality of road links based, at least in part, on the determined danger level information;
generating a plurality of notifications with notice information based on the determined danger level information associated with the at least two road links of the plurality of road links;
determining two or more vehicles approaching or traveling one or more road links of the plurality of road links,
wherein the determining of the two or more vehicles includes determining proximity information of the two or more vehicles with respect to the one or more road links of the plurality of road links,
determining a prioritizing of the plurality of notifications to the two or more vehicles approaching or traveling the road links based, at least in part, on the ranking of the road links,
wherein a first road link including a first curve with a highest danger level is reported before other road links including curves with danger levels lower than the first road link; and
transmitting, based on the determined prioritizing and the determined proximity information, the notifications to the two or more vehicles.

* * * * *